US012778137B2

(12) United States Patent
Huang et al.

(10) Patent No.: US 12,778,137 B2
(45) Date of Patent: *Nov. 3, 2026

(54) METHOD OF USING/APPLYING A KERATIN HYDROLYSIS PEPTIDE SOLUTION TO IMPROVE THE FERTILIZER USAGE EFFICIENCY IN COTTON

(71) Applicant: CH Biotech R&D Co., Ltd., Nantou City (TW)

(72) Inventors: Jenn Wen Huang, Taichung (TW); Yi-Chiao Chan, Keelung (TW); Yu-Yi Wu, Taichung (TW); Nai-Hua Ye, Changhua (TW)

(73) Assignee: CH Biotech R&D Co., Ltd., Nantou City (TW)

( * ) Notice: Subject to any disclaimer, the term of this patent is extended or adjusted under 35 U.S.C. 154(b) by 263 days.

This patent is subject to a terminal disclaimer.

(21) Appl. No.: 18/409,790

(22) Filed: Jan. 11, 2024

(65) Prior Publication Data

US 2025/0113828 A1 Apr. 10, 2025

(30) Foreign Application Priority Data

Oct. 6, 2023 (TW) ................................ 112138605

(51) Int. Cl.
*A01N 63/50* (2020.01)
*A01P 21/00* (2006.01)

(52) U.S. Cl.
CPC .............. *A01N 63/50* (2020.01); *A01P 21/00* (2021.08)

(58) Field of Classification Search
CPC ................................ A01N 63/50; A01P 21/00
See application file for complete search history.

(56) References Cited

U.S. PATENT DOCUMENTS 8,617,282 B2 * 12/2013 Szoeke .................... C05D 9/02 71/64.1
2025/0081910 A1 * 3/2025 Huang ..................... C05G 5/23
2025/0081964 A1 * 3/2025 Chen ...................... A01N 37/46
2025/0081965 A1 * 3/2025 Chen ....................... A01P 21/00
2025/0081972 A1 * 3/2025 Xia ........................ A01N 63/50
2025/0084010 A1 * 3/2025 Xia .......................... C05G 5/23
2025/0084134 A1 * 3/2025 Xia ......................... C05F 11/10
2025/0101072 A1 * 3/2025 Chen .................... A01H 1/1225
2025/0107532 A1 * 4/2025 Xia ........................ A01N 63/50
2025/0113794 A1 * 4/2025 Xia .................... G01N 33/6848
2025/0113828 A1 * 4/2025 Huang ................... A01N 63/50
2025/0127107 A1 * 4/2025 Huang ...................... C07K 1/12
2025/0128994 A1 * 4/2025 Xia ......................... C05F 11/10
2025/0128995 A1 * 4/2025 Xia ......................... C05F 11/10
2025/0136523 A1 * 5/2025 Huang .................... C05C 11/00
2025/0136524 A1 * 5/2025 Xia ......................... C05F 1/005
2025/0143323 A1 * 5/2025 Chen ........................ A01P 21/00
2025/0145678 A1 * 5/2025 Xia .................... C07K 14/4741
2025/0160325 A1 * 5/2025 Xia .......................... C12P 21/06
2025/0160337 A1 * 5/2025 Xia ........................ A01N 63/50
2025/0160338 A1 * 5/2025 Xia ........................ A01N 37/46
2025/0169507 A1 * 5/2025 Xia ........................ A01N 63/50
2025/0176560 A1 * 6/2025 Xia ......................... A01P 21/00
2025/0187995 A1 * 6/2025 Chen ....................... C05F 1/005
2025/0194606 A1 * 6/2025 Xia ......................... A01P 21/00
2025/0206677 A1 * 6/2025 Xia ......................... C05F 1/005
2025/0212892 A1 * 7/2025 Chen ...................... A01N 63/50
2025/0212893 A1 * 7/2025 Huang .................... A01P 21/00
2025/0214906 A1 * 7/2025 Xia ......................... C05C 11/00
2025/0324978 A1 * 10/2025 Huang ................... A01N 25/02

FOREIGN PATENT DOCUMENTS

WO WO 2023001946 * 1/2023

OTHER PUBLICATIONS

Cheng et al. (Hydrolysis technology of biomass waste to produce amino acids in sub-critical water), Bioresource Technology, vol. 99, Jun. 2008, pp. 3337-3341. (Year: 2008).*
Yin et al, (Self-organization of oligopeptides obtained on dissolution of feather keratins in superheated water), Biomacromolecules, 2007, 8, pp. 800-806. (Year: 2007).*
Minkiewicz et al.(BIOPEP-UWM database of the bioactive peptides: Current opportunities)., Int J Mol Sci. 2019, 20(23):5978, pp. 1-23. (Year: 2019).*

* cited by examiner

*Primary Examiner* — Mina Haghighatian
(74) *Attorney, Agent, or Firm* — Jen-Feng Lee, Esq.

(57) ABSTRACT

Present invention teaches the method of using a keratin hydrolysis peptide ("KHP") solution to improve the efficacy of fertilizer usage and absorption by cotton plants. By selectively choosing specific weights of feathers and water, and treating the mixture to a high-temperature high-pressure hydrolysis process, the resulting solution is confirmed to contain at least 253 peptides and then infused to the fertilized soil in which the cotton seeds are planted and grown. Optionally, the KHP solution can be diluted by water, as disclosed in the specification, for applying to the fertilized soil around the cotton plants.

3 Claims, 9 Drawing Sheets

Specification includes a Sequence Listing.

TABLE I

FIG. 1A

| | Peptide Sequence | Peptide mass (Da) |
|---|---|---|
| 1 | PheGlyLeuSerGlyLeu | 593.33 |
| 2 | AlaAlaValGlySerSerLeu | 604.33 |
| 3 | ThrAlaValGlySerSerThr | 622.30 |
| 4 | LeuSerLeuSerSerGln | 634.34 |
| 5 | PheGlyIleSerGlyLeuGly | 650.35 |
| 6 | ProIleLeuSerSerPhe | 663.37 |
| 7 | SerLeuLeuSerGlnGlyAla | 675.37 |
| 8 | PheAsnLeuArgGlyAla | 677.37 |
| 9 | SerAlaAlaValGlySerSerLeu | 691.36 |
| 10 | SerArgValValIleGln | 701.43 |
| 11 | SerArgValValLeuGlu | 702.41 |
| 12 | GlyPheGlyIleSerGlyLeuGly | 707.37 |
| 13 | SerArgPheSerGlyArg | 709.37 |
| 14 | ArgValValIleGlnPro | 711.45 |
| 15 | SerAlaAlaValGlySerIleLeu | 717.41 |
| 16 | IleValValIleGlyHisVal | 736.47 |
| 17 | ThrAlaValGlySerSerThrSerAla | 780.37 |
| 18 | ArgValValIleGlnProSer | 798.48 |
| 19 | SerArgValValIleGlnPro | 798.48 |
| 20 | ProGlnGlyGluGlnLeuGln | 799.39 |
| 21 | ArgAlaGlyAlaGlyProProSerPro | 809.43 |
| 22 | AspSerArgValValIleGln | 816.46 |
| 23 | ProGlyProIleLeuSerSerPhe | 817.45 |
| 24 | ProIleSerSerGlyGlyPheGlyIle | 834.44 |
| 25 | IleSerGlyLeuGlySerArgPhe | 836.46 |
| 26 | SerGlyGlyPheGlyIleSerGlyLeuGly | 851.43 |
| 27 | SerArgPheSerGlyArgArg | 865.48 |
| 28 | ProGlyLeuAlaLeuProValLeuPro | 876.56 |
| 29 | SerArgValValIleGlnProSer | 885.52 |
| 30 | ProIleLeuSerSerPheProGln | 888.48 |
| 31 | LeuGlySerGlyIlePheTrpIle | 892.49 |
| 32 | GlyIleSerGlyLeuGlySerArgPhe | 893.48 |
| 33 | ValValValThrLeuProGlyProIle | 894.57 |
| 34 | CysArgLeuSerLeuSerGlnPro | 903.47 |
| 35 | SerAlaAlaValGlySerSerLeuSerAlaGly | 906.45 |
| 36 | AlaValGlySerSerThrSerAlaAlaValGly | 906.45 |
| 37 | ValValThrLeuProGlyProIleLeu | 908.58 |
| 38 | ProGlyProIleLeuSerSerPhePro | 914.50 |
| 39 | SerAlaAlaValGlySerIleLeuSerGlu | 933.49 |
| 40 | ValProIleSerSerGlyGlyPheGlyIle | 933.50 |
| 41 | GlnLeuAlaGlnArgAsnThrIle | 943.53 |

FIG. 1B

| | Peptide Sequence | Peptide mass (Da) |
|---|---|---|
| 42 | LeuSerGlyLeuArgSerAsnLeuSer | 946.53 |
| 43 | ProSerProValValValThrLeuProGly | 965.57 |
| 44 | ProProProValValValThrLeuProGly | 975.59 |
| 45 | IleSerGlyLeuGlySerArgPheSerGly | 980.52 |
| 46 | LeuAlaLeuArgGlnSerValGluAla | 986.56 |
| 47 | ProLeuLeuGlyProProLeuLeuGlyIle | 989.64 |
| 48 | ValValThrLeuProGlyProIleLeuSer | 995.61 |
| 49 | ValThrLeuGluAspLeuArgArg | 1001.57 |
| 50 | ProIleLeuSerSerPheProGlnAsn | 1002.53 |
| 51 | ProIleLeuSerSerPheProGlnAsp | 1003.51 |
| 52 | GlyThrValGlyValSerAlaGlyValThrArg | 1003.55 |
| 53 | PheGlyLeuSerArgValThrLeuAsn | 1006.57 |
| 54 | ThrAlaValGlySerSerThrSerAlaAlaValGly | 1007.50 |
| 55 | ValValValThrLeuProGlyProIleLeu | 1007.65 |
| 56 | ProProValValValThrPheProGlyPro | 1009.57 |
| 57 | ProProProValValValThrPheProGly | 1009.57 |
| 58 | ValValIleGlnProSerProValValVal | 1036.64 |
| 59 | PheGlyIleSerGlyLeuGlySerArgPhe | 1040.55 |
| 60 | ProGlyProIleLeuSerSerPheProGln | 1042.56 |
| 61 | PheGlyTrpSerGlyLeuGlyArgGlyLeu | 1049.55 |
| 62 | LeuGluAlaGlnLeuSerGluLeuArg | 1058.58 |
| 63 | IleValGlyAlaTrpTyrThrValArg | 1064.59 |
| 64 | LeuLeuSerProProGlyLeuProGlyLeuLeu | 1076.67 |
| 65 | ValValValThrLeuProGlyProIleLeuSer | 1094.68 |
| 66 | GlyPheGlyIleSerGlyLeuGlySerArgPhe | 1097.57 |
| 67 | ProValValValThrLeuProGlyProIleLeu | 1104.70 |
| 68 | ValSerGlnGlyGluIleThrValProSerIle | 1129.61 |
| 69 | SerIleLeuSerGluGluGlyValProIleSer | 1130.59 |
| 70 | ProValValValThrPheProGlyProIleLeu | 1138.69 |
| 71 | ProIleSerSerGlyGlyPheGlyIleSerGlyLeuGly | 1148.59 |
| 72 | ValGlySerSerThrSerAlaAlaValGlySerIleLeu | 1148.62 |
| 73 | GlyPheLeuSerSerAlaValSerLeuAsnArg | 1150.62 |
| 74 | GlyGlyPheGlyIleSerGlyLeuGlySerArgPhe | 1154.60 |
| 75 | ProGlyProIleLeuSerSerPheProGlnAsn | 1156.60 |
| 76 | ProGlyProIleLeuSerSerPheProGlnAsp | 1157.58 |
| 77 | GlyGlyPheGlyTrpSerGlyLeuGlyArgGlyLeu | 1163.60 |
| 78 | ProSerProValValValThrLeuProGlyProIle | 1175.70 |
| 79 | ValValValThrLeuProGlyProIleLeuSerSer | 1181.71 |
| 80 | ProValValValThrLeuProGlyProIleLeuSer | 1191.73 |
| 81 | SerProValValValThrLeuProGlyProIleLeu | 1191.73 |
| 82 | ArgValValIleGlnProSerProValValVal | 1192.74 |
| 83 | GlnAlaLeuThrGluValTyrAlaLysAlaAsn | 1207.63 |
| 84 | IleGluThrLeuThrGlnPheLeuGlyTrp | 1207.64 |
| 85 | GlyPheGlySerArgSerLeuValGlyLeuGlyGlyThr | 1207.64 |

FIG. 1C

| | Peptide Sequence | Peptide mass (Da) |
|---|---|---|
| 86 | AlaValGlySerSerThrSerAlaAlaValGlySerIleLeu | 1219.65 |
| 87 | ProValValValThrPheProGlyProIleLeuSer | 1225.72 |
| 88 | ValGlySerSerThrSerAlaAlaValGlySerIleLeuSer | 1235.65 |
| 89 | GlyPheGlyIleSerGlyLeuGlySerArgPheSerGly | 1241.63 |
| 90 | SerGlyGlyPheGlyIleSerGlyLeuGlySerArgPhe | 1241.63 |
| 91 | ValProIleSerSerGlyGlyPheGlyIleSerGlyLeuGly | 1247.66 |
| 92 | ValValIleGlnProSerProValValValThrLeu | 1250.77 |
| 93 | SerIleLeuSerGluGluGlyValProIleSerSerGly | 1274.65 |
| 94 | ValMetGlyCysLysAlaAlaGlyAlaSerArgIleIle | 1276.69 |
| 95 | SerProValValValThrLeuProGlyProIleLeuSer | 1278.77 |
| 96 | SerArgValValIleGlnProSerProValValVal | 1279.77 |
| 97 | ProSerProValValValThrLeuProGlyProIleLeu | 1288.79 |
| 98 | ArgValValIleGlnProSerProValValValThr | 1293.79 |
| 99 | ProProProValValValThrLeuProGlyProIleLeu | 1298.81 |
| 100 | GlyValProIleSerSerGlyGlyPheGlyIleSerGlyLeuGly | 1304.68 |
| 101 | ValIleGlnProSerProValValValThrLeuProGly | 1305.78 |
| 102 | AlaValGlySerSerThrSerAlaAlaValGlySerIleLeuSer | 1306.68 |
| 103 | ThrAlaValGlySerSerThrSerAlaAlaValGlySerIleLeu | 1320.70 |
| 104 | SerGlyGlyPheGlyIleSerGlyLeuGlySerArgPheSer | 1328.66 |
| 105 | ValValValThrLeuProGlyProIleLeuSerSerPhe | 1328.78 |
| 106 | ProProProValValValThrPheProGlyProIleLeu | 1332.79 |
| 107 | GlyLeuGlyGlyPheGlyTrpSerGlyLeuGlyArgGlyLeu | 1333.70 |
| 108 | ValThrLeuProGlyProIleLeuSerSerPheProGln | 1355.76 |
| 109 | AlaValGlySerIleLeuSerGluGluGlyValProIleSer | 1357.72 |
| 110 | SerLeuGlyLeuGlyGlyPheGlyTrpSerGlyLeuGlyArg | 1363.71 |
| 111 | ProSerProValValValThrLeuProGlyProIleLeuSer | 1375.82 |
| 112 | SerArgValValIleGlnProSerProValValValThr | 1380.82 |
| 113 | SerGlyGlyPheGlyIleSerGlyLeuGlySerArgPheSerGly | 1385.68 |
| 114 | ProProProValValValThrLeuProGlyProIleLeuSer | 1385.84 |
| 115 | ValAlaIleGlnProProProValValValThrLeuProGly | 1386.84 |
| 116 | ProIleSerSerGlyGlyPheGlyIleSerGlyLeuGlySerArg | 1391.73 |
| 117 | ProIleValAspValAlaGluAlaLeuLeuHisValLys | 1403.83 |
| 118 | ValValIleGlnProSerProValValValThrLeuProGly | 1404.85 |
| 119 | ArgValValIleGlnProSerProValValValThrLeu | 1406.87 |
| 120 | ThrAlaValGlySerSerThrSerAlaAlaValGlySerIleLeuSer | 1407.73 |
| 121 | ProProProValValValThrPheProGlyProIleLeuSer | 1419.82 |
| 122 | SerLeuGlyLeuGlyGlyPheGlyTrpSerGlyLeuGlyArgGly | 1420.73 |
| 123 | ValValValThrLeuProGlyProIleLeuSerSerPhePro | 1425.84 |
| 124 | ProValValValThrLeuProGlyProIleLeuSerSerPhe | 1425.84 |
| 125 | AlaAlaValGlySerIleLeuSerGluGluGlyValProIleSer | 1428.76 |
| 126 | SerAlaAlaValGlySerIleLeuSerGluGluGlyValProIle | 1428.76 |
| 127 | GluGlyValProIleSerSerGlyGlyPheGlyIleSerGlyLeuGly | 1433.73 |
| 128 | ValValThrLeuProGlyProIleLeuSerSerPheProGln | 1454.83 |
| 129 | ProSerProValValValThrLeuProGlyProIleLeuSerSer | 1462.85 |

FIG. 1D

| | Peptide Sequence | Peptide mass (Da) |
|---|---|---|
| 130 | GlyLysAspGlyProLysGlyValArgGlyAspAlaGlyProProGly | 1464.76 |
| 131 | SerValAlaIleGlnProProProValValValThrLeuProGly | 1473.87 |
| 132 | SerArgValValIleGlnProSerProValValValThrLeu | 1493.90 |
| 133 | LeuHisThrGluAlaAlaAlaThrValProAspArgSerGlu | 1496.73 |
| 134 | ValValIleGlnProSerProValValValThrLeuProGlyPro | 1501.90 |
| 135 | ArgValValIleGlnProSerProValValValThrLeuPro | 1503.93 |
| 136 | SerAlaAlaValGlySerIleLeuSerGluGluGlyValProIleSer | 1515.79 |
| 137 | ProValValValThrLeuProGlyProIleLeuSerSerPhePro | 1522.89 |
| 138 | IleGlnProSerProValValValThrLeuProGlyProIleLeu | 1529.93 |
| 139 | SerValProIleGlyAlaGlyGlySerLeuGlyLeuGlyGlyPheGlyTrp | 1531.79 |
| 140 | SerLeuGlyLeuGlyGlyPheGlyTrpSerGlyLeuGlyArgGlyLeu | 1533.82 |
| 141 | PheGlyGlyGlyPheGlyGlyGlyAspGlyIleLeuProAlaGlyGluLys | 1535.75 |
| 142 | ThrAlaValGlySerSerThrSerAlaAlaValGlySerIleLeuSerGlu | 1536.78 |
| 143 | ProIleSerSerGlyGlyPheGlyIleSerGlyLeuGlySerArgPhe | 1538.80 |
| 144 | SerAlaAlaValGlySerSerLeuSerAlaGlySerValProIleGlyAlaGlyGly | 1544.79 |
| 145 | GlyValProIleSerSerGlyGlyPheGlyIleSerGlyLeuGlySerArg | 1547.82 |
| 146 | ValValValThrLeuProGlyProIleLeuSerSerPheProGln | 1553.89 |
| 147 | ArgValValIleGlnProSerProValValValThrLeuProGly | 1560.95 |
| 148 | SerArgValValIleGlnProSerProValValValThrLeuPro | 1590.96 |
| 149 | ProSerProValValValThrLeuProGlyProIleLeuSerSerPhe | 1609.92 |
| 150 | AlaIleGlnProProProValValValThrLeuProGlyProIleLeu | 1610.99 |
| 151 | IleGlnProSerProValValValThrLeuProGlyProIleLeuSer | 1616.96 |
| 152 | ValIleGlnProSerProValValValThrLeuProGlyProIleLeu | 1629.00 |
| 153 | ValProIleSerSerGlyGlyPheGlyIleSerGlyLeuGlySerArgPhe | 1637.86 |
| 154 | SerArgValValIleGlnProSerProValValValThrLeuProGly | 1647.98 |
| 155 | SerIleLeuSerGluGluGlyValProIleSerSerGlyGlyPheGlyIle | 1648.84 |
| 156 | ProValValValThrLeuProGlyProIleLeuSerSerPheProGln | 1650.95 |
| 157 | ArgValValIleGlnProSerProValValValThrLeuProGlyPro | 1658.00 |
| 158 | SerAlaAlaValGlySerIleLeuSerGluGluGlyValProIleSerSerGly | 1659.84 |
| 159 | ValValValThrLeuProGlyProIleLeuSerSerPheProGlnAsn | 1667.94 |
| 160 | GlyValProIleSerSerGlyGlyPheGlyIleSerGlyLeuGlySerArgPhe | 1694.89 |
| 161 | ProSerProValValValThrLeuProGlyProIleLeuSerSerPhePro | 1706.97 |
| 162 | ValAlaIleGlnProProProValValValThrLeuProGlyProIleLeu | 1710.06 |
| 163 | ValIleGlnProSerProValValValThrLeuProGlyProIleLeuSer | 1716.03 |
| 164 | ValValIleGlnProSerProValValValThrLeuProGlyProIleLeu | 1728.07 |
| 165 | SerProValValValThrLeuProGlyProIleLeuSerSerPheProGln | 1737.98 |
| 166 | ValIleLeuSerAsnThrLysThrGlnTyrSerIleLysIleHis | 1745.00 |
| 167 | SerArgValValIleGlnProSerProValValValThrLeuProGlyPro | 1745.03 |
| 168 | AspSerArgValValIleGlnProSerProValValValThrLeuProGly | 1763.01 |
| 169 | ProValValValThrLeuProGlyProIleLeuSerSerPheProGlnAsn | 1764.99 |
| 170 | ArgValValIleGlnProSerProValValValThrLeuProGlyProIle | 1771.08 |
| 171 | GlyValProIleSerSerGlyGlyPheGlyIleSerGlyLeuGlySerArgPheSer | 1781.92 |
| 172 | SerValAlaIleGlnProProProValValValThrLeuProGlyProIleLeu | 1797.09 |
| 173 | ValAlaIleGlnProProProValValValThrLeuProGlyProIleLeuSer | 1797.09 |

FIG. 1E

| | Peptide Sequence | Peptide mass (Da) |
|---|---|---|
| 174 | ValValIleGlnProSerProValValValThrLeuProGlyProIleLeuSer | 1815.10 |
| 175 | ProSerProValValValThrLeuProGlyProIleLeuSerSerPheProGln | 1835.03 |
| 176 | GlyValProIleSerSerGlyGlyPheGlyIleSerGlyLeuGlySerArgPheSerGly | 1838.94 |
| 177 | AlaValProLeuValArgProValThrMetValProSerIleProGlyIlePro | 1843.09 |
| 178 | ProProProValValValThrLeuProGlyProIleLeuSerSerPheProGln | 1845.05 |
| 179 | SerProValValValThrLeuProGlyProIleLeuSerSerPheProGlnAsn | 1852.02 |
| 180 | LeuProGlyProGlyLeuGlnLeuLeuHisGlyThrThrThrLeuAlaPheLys | 1864.07 |
| 181 | ProProProValValValThrPheProGlyProIleLeuSerSerPheProGln | 1879.04 |
| 182 | SerValAlaIleGlnProProProValValValThrLeuProGlyProIleLeuSer | 1884.12 |
| 183 | SerSerValAlaIleGlnProProProValValValThrLeuProGlyProIleLeu | 1884.12 |
| 184 | ArgValValIleGlnProSerProValValValThrLeuProGlyProIleLeu | 1884.17 |
| 185 | ProSerProValValValThrLeuProGlyProIleLeuSerSerPheProGlnAsn | 1949.07 |
| 186 | SerIleLeuSerGluGluGlyValProIleSerSerGlyGlyPheGlyIleSerGlyLeuGly | 1963.00 |
| 187 | SerArgValValIleGlnProSerProValValValThrLeuProGlyProIleLeu | 1971.20 |
| 188 | ArgValValIleGlnProSerProValValValThrLeuProGlyProIleLeuSer | 1971.20 |
| 189 | SerValProIleGlyAlaGlyGlySerLeuGlyLeuGlyGlyPheGlyTrpSerGlyLeuGlyArg | 2002.05 |
| 190 | ThrAlaValGlySerSerThrSerAlaAlaValGlySerIleLeuSerGluGluGlyValProIle | 2032.04 |
| 191 | SerAlaAlaValGlySerIleLeuSerGluGluGlyValProIleSerSerGlyGlyPheGlyIle | 2034.04 |
| 192 | SerGluGluGlyValProIleSerSerGlyGlyPheGlyIleSerGlyLeuGlySerArgPhe | 2040.00 |
| 193 | SerArgValValIleGlnProSerProValValValThrLeuProGlyProIleLeuSer | 2058.23 |
| 194 | SerValProIleGlyAlaGlyGlySerLeuGlyLeuGlyGlyPheGlyTrpSerGlyLeuGlyArg Gly | 2059.07 |
| 195 | AspSerArgValValIleGlnProSerProValValValThrLeuProGlyProIleLeu | 2086.23 |
| 196 | ThrAlaValGlySerSerThrSerAlaAlaValGlySerIleLeuSerGluGluGlyValProIleSer | 2119.08 |
| 197 | LeuArgGlyAspValGlyProValGlyArgThrGlyGluGlnGlyIleAlaGlyProProGlyPhe | 2137.11 |
| 198 | SerArgValValIleGlnProSerProValValValThrLeuProGlyProIleLeuSerSer | 2145.26 |
| 199 | ValValIleGlnProSerProValValValThrLeuProGlyProIleLeuSerSerPhePro | 2146.25 |
| 200 | GlyValProIleSerSerGlyGlyPheGlyIleSerGlyLeuGlySerArgPheSerGlyArgArg | 2151.14 |
| 201 | SerValProIleGlyAlaGlyGlySerLeuGlyLeuGlyGlyPheGlyTrpSerGlyLeuGlyArg GlyLeu | 2172.16 |
| 202 | AspSerArgValValIleGlnProSerProValValValThrLeuProGlyProIleLeuSer | 2173.26 |
| 203 | ValIleGlnProSerProValValValThrLeuProGlyProIleLeuSerSerPheProGln | 2175.24 |
| 204 | AlaValGlySerIleLeuSerGluGluGlyValProIleSerSerGlyGlyPheGlyIleSerGlyLeu Gly | 2190.13 |
| 205 | ArgValValIleGlnProSerProValValValThrLeuProGlyProIleLeuSerSerPhe | 2205.30 |
| 206 | SerIleLeuSerGluGluGlyValProIleSerSerGlyGlyPheGlyIleSerGlyLeuGlySerArg | 2206.14 |
| 207 | IleProSerSerValProGluSerSerPheLysIleLysGlyAsnSerSerSerPheHisIle | 2248.16 |
| 208 | ValAlaIleGlnProProProValValValThrLeuProGlyProIleLeuSerSerPheProGln | 2256.30 |
| 209 | ThrAlaValGlySerSerThrSerAlaAlaValGlySerIleLeuSerGluGluGlyValProIleSer SerGly | 2263.13 |

FIG. 1F

| | Peptide Sequence | Peptide mass (Da) |
|---|---|---|
| 210 | ValValIleGlnProSerProValValValThrLeuProGlyProIleLeuSerSerPheProGln | 2274.31 |
| 211 | ProSerProValValValThrLeuProGlyProIleLeuSerSerPheProGlnAsnThrAlaValGly | 2277.25 |
| 212 | LysGluAsnPheGluValLeuCysLysAspGlyThrArgLysProValThrAspAlaGlu | 2279.13 |
| 213 | SerIleGlnAlaCysLysLeuAlaGlnSerHisGlyTrpGlyValMetValSerHisArgSer | 2282.13 |
| 214 | SerArgValValIleGlnProSerProValValValThrLeuProGlyProIleLeuSerSerPhe | 2292.33 |
| 215 | ArgValValIleGlnProSerProValValValThrLeuProGlyProIleLeuSerSerPhePro | 2302.35 |
| 216 | GluGlnProProLeuCysValAlaSerValSerValLysGluProAlaSerGluThrProAlaValPro | 2335.18 |
| 217 | SerValAlaIleGlnProProProValValValThrLeuProGlyProIleLeuSerSerPheProGln | 2343.33 |
| 218 | SerAlaAlaValGlySerIleLeuSerGluGluGlyValProIleSerSerGlyGlyPheGlyIleSerGlyLeuGly | 2348.20 |
| 219 | SerIleLeuSerGluGluGlyValProIleSerSerGlyGlyPheGlyIleSerGlyLeuGlySerArgPhe | 2353.20 |
| 220 | ProSerProValValValThrLeuProGlyProIleLeuSerSerPheProGlnAsnThrAlaValGlySer | 2364.28 |
| 221 | ValValIleGlnProSerProValValValThrLeuProGlyProIleLeuSerSerPheProGlnAsn | 2388.35 |
| 222 | SerArgValValIleGlnProSerProValValValThrLeuProGlyProIleLeuSerSerPhePro | 2389.39 |
| 223 | SerSerValAlaIleGlnProProProValValValThrLeuProGlyProIleLeuSerSerPheProGln | 2430.36 |
| 224 | ArgValValIleGlnProSerProValValValThrLeuProGlyProIleLeuSerSerPheProGln | 2430.41 |
| 225 | SerIleLeuSerGluGluGlyValProIleSerSerGlyGlyPheGlyIleSerGlyLeuGlySerArgPheSer | 2440.24 |
| 226 | ThrSerAlaAlaValGlySerIleLeuSerGluGluGlyValProIleSerSerGlyGlyPheGlyIleSerGlyLeuGly | 2449.25 |
| 227 | SerIleLeuSerGluGluGlyValProIleSerSerGlyGlyPheGlyIleSerGlyLeuGlySerArgPheSerGly | 2497.26 |
| 228 | SerArgValValIleGlnProSerProValValValThrLeuProGlyProIleLeuSerSerPheProGln | 2517.44 |
| 229 | ThrAlaValGlySerSerThrSerAlaAlaValGlySerIleLeuSerGluGluGlyValProIleSerSerGlyGlyPheGly | 2524.24 |
| 230 | SerThrSerAlaAlaValGlySerIleLeuSerGluGluGlyValProIleSerSerGlyGlyPheGlyIleSerGlyLeuGly | 2536.28 |
| 231 | ArgValValIleGlnProSerProValValValThrLeuProGlyProIleLeuSerSerPheProGlnAsn | 2544.45 |
| 232 | SerArgValValIleGlnProSerProValValValThrLeuProGlyProIleLeuSerSerPheProGlnAsn | 2631.49 |
| 233 | AspSerArgValValIleGlnProSerProValValValThrLeuProGlyProIleLeuSerSerPheProGln | 2632.47 |

FIG. 1G

| | Peptide Sequence | Peptide mass (Da) |
|---|---|---|
| 234 | ThrAlaValGlySerSerThrSerAlaAlaValGlySerIleLeuSerGluGluGlyValProIleSerSerGlyGlyPheGlyIle | 2637.33 |
| 235 | SerAlaAlaValGlySerIleLeuSerGluGluGlyValProIleSerSerGlyGlyPheGlyIleSerGlyLeuGlySerArgPhe | 2738.40 |
| 236 | ValGluGlnLeuValAsnLeuGlnHisLeuAspValAlaTyrAsnLeuLeuLeuGluHisAlaGlnLeuAla | 2743.48 |
| 237 | SerValAlaIleGlnProProProValValValThrLeuProGlyProIleLeuSerSerPheProGlnSerThrAlaValGly | 2758.54 |
| 238 | SerIleLeuSerGluGluGlyValProIleSerSerGlyGlyPheGlyIleSerGlyLeuGlySerArgPheSerGlyArgArg | 2809.46 |
| 239 | ThrSerAlaAlaValGlySerIleLeuSerGluGluGlyValProIleSerSerGlyGlyPheGlyIleSerGlyLeuGlySerArgPhe | 2839.45 |
| 240 | SerSerValAlaIleGlnProProProValValValThrLeuProGlyProIleLeuSerSerPheProGlnSerThrAlaValGly | 2845.57 |
| 241 | SerThrSerAlaAlaValGlySerIleLeuSerGluGluGlyValProIleSerSerGlyGlyPheGlyIleSerGlyLeuGlySerArgPhe | 2926.48 |
| 242 | ProSerProValValValThrLeuProGlyProIleLeuSerSerPheProGlnAsnThrAlaValGlySerSerThrSerAlaAlaValGly | 2937.56 |
| 243 | ThrAlaValGlySerSerThrSerAlaAlaValGlySerIleLeuSerGluGluGlyValProIleSerSerGlyGlyPheGlyIleSerGlyLeuGly | 2951.48 |
| 244 | AlaValGlySerIleLeuSerGluGluGlyValProIleSerSerGlyGlyPheGlyIleSerGlyLeuGlySerArgPheSerGlyArgArg | 3036.59 |
| 245 | AsnLysValLeuValHisCysAlaMetGlyArgSerArgSerAlaThrLeuValLeuAlaTyrLeuMetIleTyrLysAsn | 3067.64 |
| 246 | SerSerValAlaIleGlnProProProValValValThrLeuProGlyProIleLeuSerSerPheProGlnSerThrAlaValGlySerThrAla | 3104.69 |
| 247 | AlaAlaValGlySerIleLeuSerGluGluGlyValProIleSerSerGlyGlyPheGlyIleSerGlyLeuGlySerArgPheSerGlyArgArg | 3107.62 |
| 248 | ThrAlaValGlySerSerThrSerAlaAlaValGlySerIleLeuSerGluGluGlyValProIleSerSerGlyGlyPheGlyIleSerGlyLeuGlySerArg | 3194.62 |
| 249 | SerAlaAlaValGlySerIleLeuSerGluGluGlyValProIleSerSerGlyGlyPheGlyIleSerGlyLeuGlySerArgPheSerGlyArgArg | 3194.66 |
| 250 | ProSerProValValValThrLeuProGlyProIleLeuSerSerPheProGlnAsnThrAlaValGlySerSerThrSerAlaAlaValGlySerIleLeu | 3250.76 |
| 251 | ProSerProValValValThrLeuProGlyProIleLeuSerSerPheProGlnAsnThrAlaValGlySerSerThrSerAlaAlaValGlySerIleLeuSer | 3337.79 |
| 252 | ThrAlaValGlySerSerThrSerAlaAlaValGlySerIleLeuSerGluGluGlyValProIleSerSerGlyGlyPheGlyIleSerGlyLeuGlySerArgPhe | 3341.69 |
| 253 | ArgProArgValTyrLeuHisCysThrAsnProArgHisProLysTyrArgGluGlyAspValThrLeuPheAlaLeuAsnLeuSer | 3452.81 |

SEQUENCE LISTING

```
Sequence total quantity: 253
SEQ ID NO: 1              moltype = AA  length = 6
FEATURE                   Location/Qualifiers
source                    1..6
                          mol_type = protein
                          organism = Gallus gallus
SEQUENCE: 1
FGLSGL                                                      6

SEQ ID NO: 2              moltype = AA  length = 7
FEATURE                   Location/Qualifiers
source                    1..7
                          mol_type = protein
                          organism = Gallus gallus
SEQUENCE: 2
AAVGSSL                                                     7

SEQ ID NO: 3              moltype = AA  length = 7
FEATURE                   Location/Qualifiers
source                    1..7
                          mol_type = protein
                          organism = Gallus gallus
SEQUENCE: 3
TAVGSST                                                     7

SEQ ID NO: 4              moltype = AA  length = 6
FEATURE                   Location/Qualifiers
source                    1..6
                          mol_type = protein
                          organism = Gallus gallus
SEQUENCE: 4
LSLSSQ                                                      6

SEQ ID NO: 5              moltype = AA  length = 7
FEATURE                   Location/Qualifiers
source                    1..7
                          mol_type = protein
                          organism = Gallus gallus
SEQUENCE: 5
FGISGLG                                                     7

SEQ ID NO: 6              moltype = AA  length = 6
FEATURE                   Location/Qualifiers
source                    1..6
                          mol_type = protein
                          organism = Gallus gallus
SEQUENCE: 6
PILSSF                                                      6

SEQ ID NO: 7              moltype = AA  length = 7
FEATURE                   Location/Qualifiers
source                    1..7
                          mol_type = protein
                          organism = Gallus gallus
SEQUENCE: 7
SLLSQGA                                                     7

SEQ ID NO: 8              moltype = AA  length = 6
FEATURE                   Location/Qualifiers
source                    1..6
```

```
                        mol_type = protein
                        organism = Gallus gallus
SEQUENCE: 8
FNLRGA                                                          6

SEQ ID NO: 9            moltype = AA  length = 8
FEATURE                 Location/Qualifiers
source                  1..8
                        mol_type = protein
                        organism = Gallus gallus
SEQUENCE: 9
SAAVGSSL                                                        8

SEQ ID NO: 10           moltype = AA  length = 6
FEATURE                 Location/Qualifiers
source                  1..6
                        mol_type = protein
                        organism = Gallus gallus
SEQUENCE: 10
SRVVIQ                                                          6

SEQ ID NO: 11           moltype = AA  length = 6
FEATURE                 Location/Qualifiers
source                  1..6
                        mol_type = protein
                        organism = Gallus gallus
SEQUENCE: 11
SRVVLE                                                          6

SEQ ID NO: 12           moltype = AA  length = 8
FEATURE                 Location/Qualifiers
source                  1..8
                        mol_type = protein
                        organism = Gallus gallus
SEQUENCE: 12
GFGISGLG                                                        8

SEQ ID NO: 13           moltype = AA  length = 6
FEATURE                 Location/Qualifiers
source                  1..6
                        mol_type = protein
                        organism = Gallus gallus
SEQUENCE: 13
SRFSGR                                                          6

SEQ ID NO: 14           moltype = AA  length = 6
FEATURE                 Location/Qualifiers
source                  1..6
                        mol_type = protein
                        organism = Gallus gallus
SEQUENCE: 14
RVVIQP                                                          6

SEQ ID NO: 15           moltype = AA  length = 8
FEATURE                 Location/Qualifiers
source                  1..8
                        mol_type = protein
                        organism = Gallus gallus
SEQUENCE: 15
SAAVGSIL                                                        8

SEQ ID NO: 16           moltype = AA  length = 7
FEATURE                 Location/Qualifiers
source                  1..7
                        mol_type = protein
                        organism = Gallus gallus
SEQUENCE: 16
IVVIGHV                                                         7

SEQ ID NO: 17           moltype = AA  length = 9
FEATURE                 Location/Qualifiers
source                  1..9
                        mol_type = protein
                        organism = Gallus gallus
SEQUENCE: 17
TAVGSSTSA                                                       9

SEQ ID NO: 18           moltype = AA  length = 7
FEATURE                 Location/Qualifiers
```

```
source                  1..7
                        mol_type = protein
                        organism = Gallus gallus
SEQUENCE: 18
RVVIQPS                                                     7

SEQ ID NO: 19           moltype = AA  length = 7
FEATURE                 Location/Qualifiers
source                  1..7
                        mol_type = protein
                        organism = Gallus gallus
SEQUENCE: 19
SRVVIQP                                                     7

SEQ ID NO: 20           moltype = AA  length = 7
FEATURE                 Location/Qualifiers
source                  1..7
                        mol_type = protein
                        organism = Gallus gallus
SEQUENCE: 20
PQGEQLQ                                                     7

SEQ ID NO: 21           moltype = AA  length = 9
FEATURE                 Location/Qualifiers
source                  1..9
                        mol_type = protein
                        organism = Gallus gallus
SEQUENCE: 21
RAGAGPPSP                                                   9

SEQ ID NO: 22           moltype = AA  length = 7
FEATURE                 Location/Qualifiers
source                  1..7
                        mol_type = protein
                        organism = Gallus gallus
SEQUENCE: 22
DSRVVIQ                                                     7

SEQ ID NO: 23           moltype = AA  length = 8
FEATURE                 Location/Qualifiers
source                  1..8
                        mol_type = protein
                        organism = Gallus gallus
SEQUENCE: 23
PGPILSSF                                                    8

SEQ ID NO: 24           moltype = AA  length = 9
FEATURE                 Location/Qualifiers
source                  1..9
                        mol_type = protein
                        organism = Gallus gallus
SEQUENCE: 24
PISSGGFGI                                                   9

SEQ ID NO: 25           moltype = AA  length = 8
FEATURE                 Location/Qualifiers
source                  1..8
                        mol_type = protein
                        organism = Gallus gallus
SEQUENCE: 25
ISGLGSRF                                                    8

SEQ ID NO: 26           moltype = AA  length = 10
FEATURE                 Location/Qualifiers
source                  1..10
                        mol_type = protein
                        organism = Gallus gallus
SEQUENCE: 26
SGGFGISGLG                                                  10

SEQ ID NO: 27           moltype = AA  length = 7
FEATURE                 Location/Qualifiers
source                  1..7
                        mol_type = protein
                        organism = Gallus gallus
SEQUENCE: 27
SRFSGRR                                                     7

SEQ ID NO: 28           moltype = AA  length = 9
```

```
FEATURE                 Location/Qualifiers
source                  1..9
                        mol_type = protein
                        organism = Gallus gallus
SEQUENCE: 28
PGLALPVLP                                                    9

SEQ ID NO: 29           moltype = AA  length = 8
FEATURE                 Location/Qualifiers
source                  1..8
                        mol_type = protein
                        organism = Gallus gallus
SEQUENCE: 29
SRVVIQPS                                                     8

SEQ ID NO: 30           moltype = AA  length = 8
FEATURE                 Location/Qualifiers
source                  1..8
                        mol_type = protein
                        organism = Gallus gallus
SEQUENCE: 30
PILSSFPQ                                                     8

SEQ ID NO: 31           moltype = AA  length = 8
FEATURE                 Location/Qualifiers
source                  1..8
                        mol_type = protein
                        organism = Gallus gallus
SEQUENCE: 31
LGSGIFWI                                                     8

SEQ ID NO: 32           moltype = AA  length = 9
FEATURE                 Location/Qualifiers
source                  1..9
                        mol_type = protein
                        organism = Gallus gallus
SEQUENCE: 32
GISGLGSRF                                                    9

SEQ ID NO: 33           moltype = AA  length = 9
FEATURE                 Location/Qualifiers
source                  1..9
                        mol_type = protein
                        organism = Gallus gallus
SEQUENCE: 33
VVVTLPGPI                                                    9

SEQ ID NO: 34           moltype = AA  length = 8
FEATURE                 Location/Qualifiers
source                  1..8
                        mol_type = protein
                        organism = Gallus gallus
SEQUENCE: 34
CRLSLSQP                                                     8

SEQ ID NO: 35           moltype = AA  length = 11
FEATURE                 Location/Qualifiers
source                  1..11
                        mol_type = protein
                        organism = Gallus gallus
SEQUENCE: 35
SAAVGSSLSA G                                                 11

SEQ ID NO: 36           moltype = AA  length = 11
FEATURE                 Location/Qualifiers
source                  1..11
                        mol_type = protein
                        organism = Gallus gallus
SEQUENCE: 36
AVGSSTSAAV G                                                 11

SEQ ID NO: 37           moltype = AA  length = 9
FEATURE                 Location/Qualifiers
source                  1..9
                        mol_type = protein
                        organism = Gallus gallus
SEQUENCE: 37
VVTLPGPIL                                                    9
```

```
SEQ ID NO: 38           moltype = AA  length = 9
FEATURE                 Location/Qualifiers
source                  1..9
                        mol_type = protein
                        organism = Gallus gallus
SEQUENCE: 38
PGPILSSFP                                                    9

SEQ ID NO: 39           moltype = AA  length = 10
FEATURE                 Location/Qualifiers
source                  1..10
                        mol_type = protein
                        organism = Gallus gallus
SEQUENCE: 39
SAAVGSILSE                                                   10

SEQ ID NO: 40           moltype = AA  length = 10
FEATURE                 Location/Qualifiers
source                  1..10
                        mol_type = protein
                        organism = Gallus gallus
SEQUENCE: 40
VPISSGGFGI                                                   10

SEQ ID NO: 41           moltype = AA  length = 8
FEATURE                 Location/Qualifiers
source                  1..8
                        mol_type = protein
                        organism = Gallus gallus
SEQUENCE: 41
QLAQRNTI                                                     8

SEQ ID NO: 42           moltype = AA  length = 9
FEATURE                 Location/Qualifiers
source                  1..9
                        mol_type = protein
                        organism = Gallus gallus
SEQUENCE: 42
LSGLRSNLS                                                    9

SEQ ID NO: 43           moltype = AA  length = 10
FEATURE                 Location/Qualifiers
source                  1..10
                        mol_type = protein
                        organism = Gallus gallus
SEQUENCE: 43
PSPVVVTLPG                                                   10

SEQ ID NO: 44           moltype = AA  length = 10
FEATURE                 Location/Qualifiers
source                  1..10
                        mol_type = protein
                        organism = Gallus gallus
SEQUENCE: 44
PPPVVVTLPG                                                   10

SEQ ID NO: 45           moltype = AA  length = 10
FEATURE                 Location/Qualifiers
source                  1..10
                        mol_type = protein
                        organism = Gallus gallus
SEQUENCE: 45
ISGLGSRFSG                                                   10

SEQ ID NO: 46           moltype = AA  length = 9
FEATURE                 Location/Qualifiers
source                  1..9
                        mol_type = protein
                        organism = Gallus gallus
SEQUENCE: 46
LALRQSVEA                                                    9

SEQ ID NO: 47           moltype = AA  length = 10
FEATURE                 Location/Qualifiers
source                  1..10
                        mol_type = protein
                        organism = Gallus gallus
SEQUENCE: 47
PLLGPPLLGI                                                   10
```

-continued

```
SEQ ID NO: 48          moltype = AA  length = 10
FEATURE                Location/Qualifiers
source                 1..10
                       mol_type = protein
                       organism = Gallus gallus
SEQUENCE: 48
VVTLPGPILS                                                    10

SEQ ID NO: 49          moltype = AA  length = 8
FEATURE                Location/Qualifiers
source                 1..8
                       mol_type = protein
                       organism = Gallus gallus
SEQUENCE: 49
VTLEDLRR                                                      8

SEQ ID NO: 50          moltype = AA  length = 9
FEATURE                Location/Qualifiers
source                 1..9
                       mol_type = protein
                       organism = Gallus gallus
SEQUENCE: 50
PILSSFPQN                                                     9

SEQ ID NO: 51          moltype = AA  length = 9
FEATURE                Location/Qualifiers
source                 1..9
                       mol_type = protein
                       organism = Gallus gallus
SEQUENCE: 51
PILSSFPQD                                                     9

SEQ ID NO: 52          moltype = AA  length = 11
FEATURE                Location/Qualifiers
source                 1..11
                       mol_type = protein
                       organism = Gallus gallus
SEQUENCE: 52
GTVGVSAGVT R                                                  11

SEQ ID NO: 53          moltype = AA  length = 9
FEATURE                Location/Qualifiers
source                 1..9
                       mol_type = protein
                       organism = Gallus gallus
SEQUENCE: 53
FGLSRVTLN                                                     9

SEQ ID NO: 54          moltype = AA  length = 12
FEATURE                Location/Qualifiers
source                 1..12
                       mol_type = protein
                       organism = Gallus gallus
SEQUENCE: 54
TAVGSSTSAA VG                                                 12

SEQ ID NO: 55          moltype = AA  length = 10
FEATURE                Location/Qualifiers
source                 1..10
                       mol_type = protein
                       organism = Gallus gallus
SEQUENCE: 55
VVVTLPGPIL                                                    10

SEQ ID NO: 56          moltype = AA  length = 10
FEATURE                Location/Qualifiers
source                 1..10
                       mol_type = protein
                       organism = Gallus gallus
SEQUENCE: 56
PPVVVTFPGP                                                    10

SEQ ID NO: 57          moltype = AA  length = 10
FEATURE                Location/Qualifiers
source                 1..10
                       mol_type = protein
                       organism = Gallus gallus
SEQUENCE: 57
```

```
PPPVVVTFPG                                                              10

SEQ ID NO: 58          moltype = AA  length = 10
FEATURE                Location/Qualifiers
source                 1..10
                       mol_type = protein
                       organism = Gallus gallus
SEQUENCE: 58
VVIQPSPVVV                                                              10

SEQ ID NO: 59          moltype = AA  length = 10
FEATURE                Location/Qualifiers
source                 1..10
                       mol_type = protein
                       organism = Gallus gallus
SEQUENCE: 59
FGISGLGSRF                                                              10

SEQ ID NO: 60          moltype = AA  length = 10
FEATURE                Location/Qualifiers
source                 1..10
                       mol_type = protein
                       organism = Gallus gallus
SEQUENCE: 60
PGPILSSFPQ                                                              10

SEQ ID NO: 61          moltype = AA  length = 10
FEATURE                Location/Qualifiers
source                 1..10
                       mol_type = protein
                       organism = Gallus gallus
SEQUENCE: 61
FGWSGLGRGL                                                              10

SEQ ID NO: 62          moltype = AA  length = 9
FEATURE                Location/Qualifiers
source                 1..9
                       mol_type = protein
                       organism = Gallus gallus
SEQUENCE: 62
LEAQLSELR                                                               9

SEQ ID NO: 63          moltype = AA  length = 9
FEATURE                Location/Qualifiers
source                 1..9
                       mol_type = protein
                       organism = Gallus gallus
SEQUENCE: 63
IVGAWYTVR                                                               9

SEQ ID NO: 64          moltype = AA  length = 11
FEATURE                Location/Qualifiers
source                 1..11
                       mol_type = protein
                       organism = Gallus gallus
SEQUENCE: 64
LLSPPGLPGL L                                                            11

SEQ ID NO: 65          moltype = AA  length = 11
FEATURE                Location/Qualifiers
source                 1..11
                       mol_type = protein
                       organism = Gallus gallus
SEQUENCE: 65
VVVTLPGPIL S                                                            11

SEQ ID NO: 66          moltype = AA  length = 11
FEATURE                Location/Qualifiers
source                 1..11
                       mol_type = protein
                       organism = Gallus gallus
SEQUENCE: 66
GFGISGLGSR F                                                            11

SEQ ID NO: 67          moltype = AA  length = 11
FEATURE                Location/Qualifiers
source                 1..11
                       mol_type = protein
                       organism = Gallus gallus
```

-continued

```
SEQUENCE: 67
PVVVTLPGPI L                                                    11

SEQ ID NO: 68           moltype = AA  length = 11
FEATURE                 Location/Qualifiers
source                  1..11
                        mol_type = protein
                        organism = Gallus gallus
SEQUENCE: 68
VSQGEITVPS I                                                    11

SEQ ID NO: 69           moltype = AA  length = 11
FEATURE                 Location/Qualifiers
source                  1..11
                        mol_type = protein
                        organism = Gallus gallus
SEQUENCE: 69
SILSEEGVPI S                                                    11

SEQ ID NO: 70           moltype = AA  length = 11
FEATURE                 Location/Qualifiers
source                  1..11
                        mol_type = protein
                        organism = Gallus gallus
SEQUENCE: 70
PVVVTFPGPI L                                                    11

SEQ ID NO: 71           moltype = AA  length = 13
FEATURE                 Location/Qualifiers
source                  1..13
                        mol_type = protein
                        organism = Gallus gallus
SEQUENCE: 71
PISSGGFGIS GLG                                                  13

SEQ ID NO: 72           moltype = AA  length = 13
FEATURE                 Location/Qualifiers
source                  1..13
                        mol_type = protein
                        organism = Gallus gallus
SEQUENCE: 72
VGSSTSAAVG SIL                                                  13

SEQ ID NO: 73           moltype = AA  length = 11
FEATURE                 Location/Qualifiers
source                  1..11
                        mol_type = protein
                        organism = Gallus gallus
SEQUENCE: 73
GFLSSAVSLN R                                                    11

SEQ ID NO: 74           moltype = AA  length = 12
FEATURE                 Location/Qualifiers
source                  1..12
                        mol_type = protein
                        organism = Gallus gallus
SEQUENCE: 74
GGFGISGLGS RF                                                   12

SEQ ID NO: 75           moltype = AA  length = 11
FEATURE                 Location/Qualifiers
source                  1..11
                        mol_type = protein
                        organism = Gallus gallus
SEQUENCE: 75
PGPILSSFPQ N                                                    11

SEQ ID NO: 76           moltype = AA  length = 11
FEATURE                 Location/Qualifiers
source                  1..11
                        mol_type = protein
                        organism = Gallus gallus
SEQUENCE: 76
PGPILSSFPQ D                                                    11

SEQ ID NO: 77           moltype = AA  length = 12
FEATURE                 Location/Qualifiers
source                  1..12
                        mol_type = protein
```

```
                        organism = Gallus gallus
SEQUENCE: 77
GGFGWSGLGR GL                                                       12

SEQ ID NO: 78           moltype = AA  length = 12
FEATURE                 Location/Qualifiers
source                  1..12
                        mol_type = protein
                        organism = Gallus gallus
SEQUENCE: 78
PSPVVVTLPG PI                                                       12

SEQ ID NO: 79           moltype = AA  length = 12
FEATURE                 Location/Qualifiers
source                  1..12
                        mol_type = protein
                        organism = Gallus gallus
SEQUENCE: 79
VVVTLPGPIL SS                                                       12

SEQ ID NO: 80           moltype = AA  length = 12
FEATURE                 Location/Qualifiers
source                  1..12
                        mol_type = protein
                        organism = Gallus gallus
SEQUENCE: 80
PVVVTLPGPI LS                                                       12

SEQ ID NO: 81           moltype = AA  length = 12
FEATURE                 Location/Qualifiers
source                  1..12
                        mol_type = protein
                        organism = Gallus gallus
SEQUENCE: 81
SPVVVTLPGP IL                                                       12

SEQ ID NO: 82           moltype = AA  length = 11
FEATURE                 Location/Qualifiers
source                  1..11
                        mol_type = protein
                        organism = Gallus gallus
SEQUENCE: 82
RVVIQPSPVV V                                                        11

SEQ ID NO: 83           moltype = AA  length = 11
FEATURE                 Location/Qualifiers
source                  1..11
                        mol_type = protein
                        organism = Gallus gallus
SEQUENCE: 83
QALTEVYAKA N                                                        11

SEQ ID NO: 84           moltype = AA  length = 10
FEATURE                 Location/Qualifiers
source                  1..10
                        mol_type = protein
                        organism = Gallus gallus
SEQUENCE: 84
IETLTQFLGW                                                          10

SEQ ID NO: 85           moltype = AA  length = 13
FEATURE                 Location/Qualifiers
source                  1..13
                        mol_type = protein
                        organism = Gallus gallus
SEQUENCE: 85
GFGSRSLVGL GGT                                                      13

SEQ ID NO: 86           moltype = AA  length = 14
FEATURE                 Location/Qualifiers
source                  1..14
                        mol_type = protein
                        organism = Gallus gallus
SEQUENCE: 86
AVGSSTSAAV GSIL                                                     14

SEQ ID NO: 87           moltype = AA  length = 12
FEATURE                 Location/Qualifiers
source                  1..12
```

```
                        mol_type = protein
                        organism = Gallus gallus
SEQUENCE: 87
PVVVTFPGPI LS                                                   12

SEQ ID NO: 88           moltype = AA  length = 14
FEATURE                 Location/Qualifiers
source                  1..14
                        mol_type = protein
                        organism = Gallus gallus
SEQUENCE: 88
VGSSTSAAVG SILS                                                 14

SEQ ID NO: 89           moltype = AA  length = 13
FEATURE                 Location/Qualifiers
source                  1..13
                        mol_type = protein
                        organism = Gallus gallus
SEQUENCE: 89
GFGISGLGSR FSG                                                  13

SEQ ID NO: 90           moltype = AA  length = 13
FEATURE                 Location/Qualifiers
source                  1..13
                        mol_type = protein
                        organism = Gallus gallus
SEQUENCE: 90
SGGFGISGLG SRF                                                  13

SEQ ID NO: 91           moltype = AA  length = 14
FEATURE                 Location/Qualifiers
source                  1..14
                        mol_type = protein
                        organism = Gallus gallus
SEQUENCE: 91
VPISSGGFGI SGLG                                                 14

SEQ ID NO: 92           moltype = AA  length = 12
FEATURE                 Location/Qualifiers
source                  1..12
                        mol_type = protein
                        organism = Gallus gallus
SEQUENCE: 92
VVIQPSPVVV TL                                                   12

SEQ ID NO: 93           moltype = AA  length = 13
FEATURE                 Location/Qualifiers
source                  1..13
                        mol_type = protein
                        organism = Gallus gallus
SEQUENCE: 93
SILSEEGVPI SSG                                                  13

SEQ ID NO: 94           moltype = AA  length = 13
FEATURE                 Location/Qualifiers
source                  1..13
                        mol_type = protein
                        organism = Gallus gallus
SEQUENCE: 94
VMGCKAAGAS RII                                                  13

SEQ ID NO: 95           moltype = AA  length = 13
FEATURE                 Location/Qualifiers
source                  1..13
                        mol_type = protein
                        organism = Gallus gallus
SEQUENCE: 95
SPVVVTLPGP ILS                                                  13

SEQ ID NO: 96           moltype = AA  length = 12
FEATURE                 Location/Qualifiers
source                  1..12
                        mol_type = protein
                        organism = Gallus gallus
SEQUENCE: 96
SRVVIQPSPV VV                                                   12

SEQ ID NO: 97           moltype = AA  length = 13
FEATURE                 Location/Qualifiers
```

```
source                 1..13
                       mol_type = protein
                       organism = Gallus gallus
SEQUENCE: 97
PSPVVVTLPG PIL                                                        13

SEQ ID NO: 98          moltype = AA  length = 12
FEATURE                Location/Qualifiers
source                 1..12
                       mol_type = protein
                       organism = Gallus gallus
SEQUENCE: 98
RVVIQPSPVV VT                                                         12

SEQ ID NO: 99          moltype = AA  length = 13
FEATURE                Location/Qualifiers
source                 1..13
                       mol_type = protein
                       organism = Gallus gallus
SEQUENCE: 99
PPPVVVTLPG PIL                                                        13

SEQ ID NO: 100         moltype = AA  length = 15
FEATURE                Location/Qualifiers
source                 1..15
                       mol_type = protein
                       organism = Gallus gallus
SEQUENCE: 100
GVPISSGGFG ISGLG                                                      15

SEQ ID NO: 101         moltype = AA  length = 13
FEATURE                Location/Qualifiers
source                 1..13
                       mol_type = protein
                       organism = Gallus gallus
SEQUENCE: 101
VIQPSPVVVT LPG                                                        13

SEQ ID NO: 102         moltype = AA  length = 15
FEATURE                Location/Qualifiers
source                 1..15
                       mol_type = protein
                       organism = Gallus gallus
SEQUENCE: 102
AVGSSTSAAV GSILS                                                      15

SEQ ID NO: 103         moltype = AA  length = 15
FEATURE                Location/Qualifiers
source                 1..15
                       mol_type = protein
                       organism = Gallus gallus
SEQUENCE: 103
TAVGSSTSAA VGSIL                                                      15

SEQ ID NO: 104         moltype = AA  length = 14
FEATURE                Location/Qualifiers
source                 1..14
                       mol_type = protein
                       organism = Gallus gallus
SEQUENCE: 104
SGGFGISGLG SRFS                                                       14

SEQ ID NO: 105         moltype = AA  length = 13
FEATURE                Location/Qualifiers
source                 1..13
                       mol_type = protein
                       organism = Gallus gallus
SEQUENCE: 105
VVVTLPGPIL SSF                                                        13

SEQ ID NO: 106         moltype = AA  length = 13
FEATURE                Location/Qualifiers
source                 1..13
                       mol_type = protein
                       organism = Gallus gallus
SEQUENCE: 106
PPPVVVTFPG PIL                                                        13

SEQ ID NO: 107         moltype = AA  length = 14
```

```
FEATURE                 Location/Qualifiers
source                  1..14
                        mol_type = protein
                        organism = Gallus gallus
SEQUENCE: 107
GLGGFGWSGL GRGL                                                   14

SEQ ID NO: 108          moltype = AA  length = 13
FEATURE                 Location/Qualifiers
source                  1..13
                        mol_type = protein
                        organism = Gallus gallus
SEQUENCE: 108
VTLPGPILSS FPQ                                                    13

SEQ ID NO: 109          moltype = AA  length = 14
FEATURE                 Location/Qualifiers
source                  1..14
                        mol_type = protein
                        organism = Gallus gallus
SEQUENCE: 109
AVGSILSEEG VPIS                                                   14

SEQ ID NO: 110          moltype = AA  length = 14
FEATURE                 Location/Qualifiers
source                  1..14
                        mol_type = protein
                        organism = Gallus gallus
SEQUENCE: 110
SLGLGGFGWS GLGR                                                   14

SEQ ID NO: 111          moltype = AA  length = 14
FEATURE                 Location/Qualifiers
source                  1..14
                        mol_type = protein
                        organism = Gallus gallus
SEQUENCE: 111
PSPVVVTLPG PILS                                                   14

SEQ ID NO: 112          moltype = AA  length = 13
FEATURE                 Location/Qualifiers
source                  1..13
                        mol_type = protein
                        organism = Gallus gallus
SEQUENCE: 112
SRVVIQPSPV VVT                                                    13

SEQ ID NO: 113          moltype = AA  length = 15
FEATURE                 Location/Qualifiers
source                  1..15
                        mol_type = protein
                        organism = Gallus gallus
SEQUENCE: 113
SGGFGISGLG SRFSG                                                  15

SEQ ID NO: 114          moltype = AA  length = 14
FEATURE                 Location/Qualifiers
source                  1..14
                        mol_type = protein
                        organism = Gallus gallus
SEQUENCE: 114
PPPVVVTLPG PILS                                                   14

SEQ ID NO: 115          moltype = AA  length = 14
FEATURE                 Location/Qualifiers
source                  1..14
                        mol_type = protein
                        organism = Gallus gallus
SEQUENCE: 115
VAIQPPPVVV TLPG                                                   14

SEQ ID NO: 116          moltype = AA  length = 15
FEATURE                 Location/Qualifiers
source                  1..15
                        mol_type = protein
                        organism = Gallus gallus
SEQUENCE: 116
PISSGGFGIS GLGSR                                                  15
```

```
SEQ ID NO: 117          moltype = AA  length = 13
FEATURE                 Location/Qualifiers
source                  1..13
                        mol_type = protein
                        organism = Gallus gallus
SEQUENCE: 117
PIVDVAEALL HVK                                                       13

SEQ ID NO: 118          moltype = AA  length = 14
FEATURE                 Location/Qualifiers
source                  1..14
                        mol_type = protein
                        organism = Gallus gallus
SEQUENCE: 118
VVIQPSPVVV TLPG                                                      14

SEQ ID NO: 119          moltype = AA  length = 13
FEATURE                 Location/Qualifiers
source                  1..13
                        mol_type = protein
                        organism = Gallus gallus
SEQUENCE: 119
RVVIQPSPVV VTL                                                       13

SEQ ID NO: 120          moltype = AA  length = 16
FEATURE                 Location/Qualifiers
source                  1..16
                        mol_type = protein
                        organism = Gallus gallus
SEQUENCE: 120
TAVGSSTSAA VGSILS                                                    16

SEQ ID NO: 121          moltype = AA  length = 14
FEATURE                 Location/Qualifiers
source                  1..14
                        mol_type = protein
                        organism = Gallus gallus
SEQUENCE: 121
PPPVVVTFPG PILS                                                      14

SEQ ID NO: 122          moltype = AA  length = 15
FEATURE                 Location/Qualifiers
source                  1..15
                        mol_type = protein
                        organism = Gallus gallus
SEQUENCE: 122
SLGLGGFGWS GLGRG                                                     15

SEQ ID NO: 123          moltype = AA  length = 14
FEATURE                 Location/Qualifiers
source                  1..14
                        mol_type = protein
                        organism = Gallus gallus
SEQUENCE: 123
VVVTLPGPIL SSFP                                                      14

SEQ ID NO: 124          moltype = AA  length = 14
FEATURE                 Location/Qualifiers
source                  1..14
                        mol_type = protein
                        organism = Gallus gallus
SEQUENCE: 124
PVVVTLPGPI LSSF                                                      14

SEQ ID NO: 125          moltype = AA  length = 15
FEATURE                 Location/Qualifiers
source                  1..15
                        mol_type = protein
                        organism = Gallus gallus
SEQUENCE: 125
AAVGSILSEE GVPIS                                                     15

SEQ ID NO: 126          moltype = AA  length = 15
FEATURE                 Location/Qualifiers
source                  1..15
                        mol_type = protein
                        organism = Gallus gallus
SEQUENCE: 126
SAAVGSILSE EGVPI                                                     15
```

```
SEQ ID NO: 127          moltype = AA  length = 16
FEATURE                 Location/Qualifiers
source                  1..16
                        mol_type = protein
                        organism = Gallus gallus
SEQUENCE: 127
EGVPISSGGF GISGLG                                                   16

SEQ ID NO: 128          moltype = AA  length = 14
FEATURE                 Location/Qualifiers
source                  1..14
                        mol_type = protein
                        organism = Gallus gallus
SEQUENCE: 128
VVTLPGPILS SFPQ                                                     14

SEQ ID NO: 129          moltype = AA  length = 15
FEATURE                 Location/Qualifiers
source                  1..15
                        mol_type = protein
                        organism = Gallus gallus
SEQUENCE: 129
PSPVVVTLPG PILSS                                                    15

SEQ ID NO: 130          moltype = AA  length = 16
FEATURE                 Location/Qualifiers
source                  1..16
                        mol_type = protein
                        organism = Gallus gallus
SEQUENCE: 130
GKDGPKGVRG DAGPPG                                                   16

SEQ ID NO: 131          moltype = AA  length = 15
FEATURE                 Location/Qualifiers
source                  1..15
                        mol_type = protein
                        organism = Gallus gallus
SEQUENCE: 131
SVAIQPPPVV VTLPG                                                    15

SEQ ID NO: 132          moltype = AA  length = 14
FEATURE                 Location/Qualifiers
source                  1..14
                        mol_type = protein
                        organism = Gallus gallus
SEQUENCE: 132
SRVVIQPSPV VVTL                                                     14

SEQ ID NO: 133          moltype = AA  length = 14
FEATURE                 Location/Qualifiers
source                  1..14
                        mol_type = protein
                        organism = Gallus gallus
SEQUENCE: 133
LHTEAAATVP DRSE                                                     14

SEQ ID NO: 134          moltype = AA  length = 15
FEATURE                 Location/Qualifiers
source                  1..15
                        mol_type = protein
                        organism = Gallus gallus
SEQUENCE: 134
VVIQPSPVVV TLPGP                                                    15

SEQ ID NO: 135          moltype = AA  length = 14
FEATURE                 Location/Qualifiers
source                  1..14
                        mol_type = protein
                        organism = Gallus gallus
SEQUENCE: 135
RVVIQPSPVV VTLP                                                     14

SEQ ID NO: 136          moltype = AA  length = 16
FEATURE                 Location/Qualifiers
source                  1..16
                        mol_type = protein
                        organism = Gallus gallus
SEQUENCE: 136
```

```
SAAVGSILSE EGVPIS                                                16

SEQ ID NO: 137          moltype = AA  length = 15
FEATURE                 Location/Qualifiers
source                  1..15
                        mol_type = protein
                        organism = Gallus gallus
SEQUENCE: 137
PVVVTLPGPI LSSFP                                                 15

SEQ ID NO: 138          moltype = AA  length = 15
FEATURE                 Location/Qualifiers
source                  1..15
                        mol_type = protein
                        organism = Gallus gallus
SEQUENCE: 138
IQPSPVVVTL PGPIL                                                 15

SEQ ID NO: 139          moltype = AA  length = 17
FEATURE                 Location/Qualifiers
source                  1..17
                        mol_type = protein
                        organism = Gallus gallus
SEQUENCE: 139
SVPIGAGGSL GLGGFGW                                               17

SEQ ID NO: 140          moltype = AA  length = 16
FEATURE                 Location/Qualifiers
source                  1..16
                        mol_type = protein
                        organism = Gallus gallus
SEQUENCE: 140
SLGLGGFGWS GLGRGL                                                16

SEQ ID NO: 141          moltype = AA  length = 17
FEATURE                 Location/Qualifiers
source                  1..17
                        mol_type = protein
                        organism = Gallus gallus
SEQUENCE: 141
FGGGFGGGDG ILPAGEK                                               17

SEQ ID NO: 142          moltype = AA  length = 17
FEATURE                 Location/Qualifiers
source                  1..17
                        mol_type = protein
                        organism = Gallus gallus
SEQUENCE: 142
TAVGSSTSAA VGSILSE                                               17

SEQ ID NO: 143          moltype = AA  length = 16
FEATURE                 Location/Qualifiers
source                  1..16
                        mol_type = protein
                        organism = Gallus gallus
SEQUENCE: 143
PISSGGFGIS GLGSRF                                                16

SEQ ID NO: 144          moltype = AA  length = 19
FEATURE                 Location/Qualifiers
source                  1..19
                        mol_type = protein
                        organism = Gallus gallus
SEQUENCE: 144
SAAVGSSLSA GSVPIGAGG                                             19

SEQ ID NO: 145          moltype = AA  length = 17
FEATURE                 Location/Qualifiers
source                  1..17
                        mol_type = protein
                        organism = Gallus gallus
SEQUENCE: 145
GVPISSGGFG ISGLGSR                                               17

SEQ ID NO: 146          moltype = AA  length = 15
FEATURE                 Location/Qualifiers
source                  1..15
                        mol_type = protein
                        organism = Gallus gallus
```

SEQUENCE: 146
VVVTLPGPIL SSFPQ 15

SEQ ID NO: 147 moltype = AA length = 15
FEATURE Location/Qualifiers
source 1..15
mol_type = protein
organism = Gallus gallus
SEQUENCE: 147
RVVIQPSPVV VTLPG 15

SEQ ID NO: 148 moltype = AA length = 15
FEATURE Location/Qualifiers
source 1..15
mol_type = protein
organism = Gallus gallus
SEQUENCE: 148
SRVVIQPSPV VVTLP 15

SEQ ID NO: 149 moltype = AA length = 16
FEATURE Location/Qualifiers
source 1..16
mol_type = protein
organism = Gallus gallus
SEQUENCE: 149
PSPVVVTLPG PILSSF 16

SEQ ID NO: 150 moltype = AA length = 16
FEATURE Location/Qualifiers
source 1..16
mol_type = protein
organism = Gallus gallus
SEQUENCE: 150
AIQPPPVVVT LPGPIL 16

SEQ ID NO: 151 moltype = AA length = 16
FEATURE Location/Qualifiers
source 1..16
mol_type = protein
organism = Gallus gallus
SEQUENCE: 151
IQPSPVVVTL PGPILS 16

SEQ ID NO: 152 moltype = AA length = 16
FEATURE Location/Qualifiers
source 1..16
mol_type = protein
organism = Gallus gallus
SEQUENCE: 152
VIQPSPVVVT LPGPIL 16

SEQ ID NO: 153 moltype = AA length = 17
FEATURE Location/Qualifiers
source 1..17
mol_type = protein
organism = Gallus gallus
SEQUENCE: 153
VPISSGGFGI SGLGSRF 17

SEQ ID NO: 154 moltype = AA length = 16
FEATURE Location/Qualifiers
source 1..16
mol_type = protein
organism = Gallus gallus
SEQUENCE: 154
SRVVIQPSPV VVTLPG 16

SEQ ID NO: 155 moltype = AA length = 17
FEATURE Location/Qualifiers
source 1..17
mol_type = protein
organism = Gallus gallus
SEQUENCE: 155
SILSEEGVPI SSGGFGI 17

SEQ ID NO: 156 moltype = AA length = 16
FEATURE Location/Qualifiers
source 1..16
mol_type = protein

```
                        organism = Gallus gallus
SEQUENCE: 156
PVVVTLPGPI LSSFPQ                                                   16

SEQ ID NO: 157          moltype = AA  length = 16
FEATURE                 Location/Qualifiers
source                  1..16
                        mol_type = protein
                        organism = Gallus gallus
SEQUENCE: 157
RVVIQPSPVV VTLPGP                                                   16

SEQ ID NO: 158          moltype = AA  length = 18
FEATURE                 Location/Qualifiers
source                  1..18
                        mol_type = protein
                        organism = Gallus gallus
SEQUENCE: 158
SAAVGSILSE EGVPISSG                                                 18

SEQ ID NO: 159          moltype = AA  length = 16
FEATURE                 Location/Qualifiers
source                  1..16
                        mol_type = protein
                        organism = Gallus gallus
SEQUENCE: 159
VVVTLPGPIL SSFPQN                                                   16

SEQ ID NO: 160          moltype = AA  length = 18
FEATURE                 Location/Qualifiers
source                  1..18
                        mol_type = protein
                        organism = Gallus gallus
SEQUENCE: 160
GVPISSGGFG ISGLGSRF                                                 18

SEQ ID NO: 161          moltype = AA  length = 17
FEATURE                 Location/Qualifiers
source                  1..17
                        mol_type = protein
                        organism = Gallus gallus
SEQUENCE: 161
PSPVVVTLPG PILSSFP                                                  17

SEQ ID NO: 162          moltype = AA  length = 17
FEATURE                 Location/Qualifiers
source                  1..17
                        mol_type = protein
                        organism = Gallus gallus
SEQUENCE: 162
VAIQPPPVVV TLPGPIL                                                  17

SEQ ID NO: 163          moltype = AA  length = 17
FEATURE                 Location/Qualifiers
source                  1..17
                        mol_type = protein
                        organism = Gallus gallus
SEQUENCE: 163
VIQPSPVVVT LPGPILS                                                  17

SEQ ID NO: 164          moltype = AA  length = 17
FEATURE                 Location/Qualifiers
source                  1..17
                        mol_type = protein
                        organism = Gallus gallus
SEQUENCE: 164
VVIQPSPVVV TLPGPIL                                                  17

SEQ ID NO: 165          moltype = AA  length = 17
FEATURE                 Location/Qualifiers
source                  1..17
                        mol_type = protein
                        organism = Gallus gallus
SEQUENCE: 165
SPVVVTLPGP ILSSFPQ                                                  17

SEQ ID NO: 166          moltype = AA  length = 15
FEATURE                 Location/Qualifiers
source                  1..15
```

```
                         mol_type = protein
                         organism = Gallus gallus
SEQUENCE: 166
VILSNTKTQY SIKIH                                                 15

SEQ ID NO: 167           moltype = AA  length = 17
FEATURE                  Location/Qualifiers
source                   1..17
                         mol_type = protein
                         organism = Gallus gallus
SEQUENCE: 167
SRVVIQPSPV VVTLPGP                                               17

SEQ ID NO: 168           moltype = AA  length = 17
FEATURE                  Location/Qualifiers
source                   1..17
                         mol_type = protein
                         organism = Gallus gallus
SEQUENCE: 168
DSRVVIQPSP VVVTLPG                                               17

SEQ ID NO: 169           moltype = AA  length = 17
FEATURE                  Location/Qualifiers
source                   1..17
                         mol_type = protein
                         organism = Gallus gallus
SEQUENCE: 169
PVVVTLPGPI LSSFPQN                                               17

SEQ ID NO: 170           moltype = AA  length = 17
FEATURE                  Location/Qualifiers
source                   1..17
                         mol_type = protein
                         organism = Gallus gallus
SEQUENCE: 170
RVVIQPSPVV VTLPGPI                                               17

SEQ ID NO: 171           moltype = AA  length = 19
FEATURE                  Location/Qualifiers
source                   1..19
                         mol_type = protein
                         organism = Gallus gallus
SEQUENCE: 171
GVPISSGGFG ISGLGSRFS                                             19

SEQ ID NO: 172           moltype = AA  length = 18
FEATURE                  Location/Qualifiers
source                   1..18
                         mol_type = protein
                         organism = Gallus gallus
SEQUENCE: 172
SVAIQPPPVV VTLPGPIL                                              18

SEQ ID NO: 173           moltype = AA  length = 18
FEATURE                  Location/Qualifiers
source                   1..18
                         mol_type = protein
                         organism = Gallus gallus
SEQUENCE: 173
VAIQPPPVVV TLPGPILS                                              18

SEQ ID NO: 174           moltype = AA  length = 18
FEATURE                  Location/Qualifiers
source                   1..18
                         mol_type = protein
                         organism = Gallus gallus
SEQUENCE: 174
VVIQPSPVVV TLPGPILS                                              18

SEQ ID NO: 175           moltype = AA  length = 18
FEATURE                  Location/Qualifiers
source                   1..18
                         mol_type = protein
                         organism = Gallus gallus
SEQUENCE: 175
PSPVVVTLPG PILSSFPQ                                              18

SEQ ID NO: 176           moltype = AA  length = 20
FEATURE                  Location/Qualifiers
```

```
source                  1..20
                        mol_type = protein
                        organism = Gallus gallus
SEQUENCE: 176
GVPISSGGFG ISGLGSRFSG                                                       20

SEQ ID NO: 177          moltype = AA  length = 18
FEATURE                 Location/Qualifiers
source                  1..18
                        mol_type = protein
                        organism = Gallus gallus
SEQUENCE: 177
AVPLVRPVTM VPSIPGIP                                                         18

SEQ ID NO: 178          moltype = AA  length = 18
FEATURE                 Location/Qualifiers
source                  1..18
                        mol_type = protein
                        organism = Gallus gallus
SEQUENCE: 178
PPPVVVTLPG PILSSFPQ                                                         18

SEQ ID NO: 179          moltype = AA  length = 18
FEATURE                 Location/Qualifiers
source                  1..18
                        mol_type = protein
                        organism = Gallus gallus
SEQUENCE: 179
SPVVVTLPGP ILSSFPQN                                                         18

SEQ ID NO: 180          moltype = AA  length = 18
FEATURE                 Location/Qualifiers
source                  1..18
                        mol_type = protein
                        organism = Gallus gallus
SEQUENCE: 180
LPGPGLQLLH GTTTLAFK                                                         18

SEQ ID NO: 181          moltype = AA  length = 18
FEATURE                 Location/Qualifiers
source                  1..18
                        mol_type = protein
                        organism = Gallus gallus
SEQUENCE: 181
PPPVVVTFPG PILSSFPQ                                                         18

SEQ ID NO: 182          moltype = AA  length = 19
FEATURE                 Location/Qualifiers
source                  1..19
                        mol_type = protein
                        organism = Gallus gallus
SEQUENCE: 182
SVAIQPPPVV VTLPGPILS                                                        19

SEQ ID NO: 183          moltype = AA  length = 19
FEATURE                 Location/Qualifiers
source                  1..19
                        mol_type = protein
                        organism = Gallus gallus
SEQUENCE: 183
SSVAIQPPPV VVTLPGPIL                                                        19

SEQ ID NO: 184          moltype = AA  length = 18
FEATURE                 Location/Qualifiers
source                  1..18
                        mol_type = protein
                        organism = Gallus gallus
SEQUENCE: 184
RVVIQPSPVV VTLPGPIL                                                         18

SEQ ID NO: 185          moltype = AA  length = 19
FEATURE                 Location/Qualifiers
source                  1..19
                        mol_type = protein
                        organism = Gallus gallus
SEQUENCE: 185
PSPVVVTLPG PILSSFPQN                                                        19

SEQ ID NO: 186          moltype = AA  length = 21
```

```
FEATURE                Location/Qualifiers
source                 1..21
                       mol_type = protein
                       organism = Gallus gallus
SEQUENCE: 186
SILSEEGVPI SSGGFGISGL G                                            21

SEQ ID NO: 187         moltype = AA  length = 19
FEATURE                Location/Qualifiers
source                 1..19
                       mol_type = protein
                       organism = Gallus gallus
SEQUENCE: 187
SRVVIQPSPV VVTLPGPIL                                               19

SEQ ID NO: 188         moltype = AA  length = 19
FEATURE                Location/Qualifiers
source                 1..19
                       mol_type = protein
                       organism = Gallus gallus
SEQUENCE: 188
RVVIQPSPVV VTLPGPILS                                               19

SEQ ID NO: 189         moltype = AA  length = 22
FEATURE                Location/Qualifiers
source                 1..22
                       mol_type = protein
                       organism = Gallus gallus
SEQUENCE: 189
SVPIGAGGSL GLGGFGWSGL GR                                           22

SEQ ID NO: 190         moltype = AA  length = 22
FEATURE                Location/Qualifiers
source                 1..22
                       mol_type = protein
                       organism = Gallus gallus
SEQUENCE: 190
TAVGSSTSAA VGSILSEEGV PI                                           22

SEQ ID NO: 191         moltype = AA  length = 22
FEATURE                Location/Qualifiers
source                 1..22
                       mol_type = protein
                       organism = Gallus gallus
SEQUENCE: 191
SAAVGSILSE EGVPISSGGF GI                                           22

SEQ ID NO: 192         moltype = AA  length = 21
FEATURE                Location/Qualifiers
source                 1..21
                       mol_type = protein
                       organism = Gallus gallus
SEQUENCE: 192
SEEGVPISSG GFGISGLGSR F                                            21

SEQ ID NO: 193         moltype = AA  length = 20
FEATURE                Location/Qualifiers
source                 1..20
                       mol_type = protein
                       organism = Gallus gallus
SEQUENCE: 193
SRVVIQPSPV VVTLPGPILS                                              20

SEQ ID NO: 194         moltype = AA  length = 23
FEATURE                Location/Qualifiers
source                 1..23
                       mol_type = protein
                       organism = Gallus gallus
SEQUENCE: 194
SVPIGAGGSL GLGGFGWSGL GRG                                          23

SEQ ID NO: 195         moltype = AA  length = 20
FEATURE                Location/Qualifiers
source                 1..20
                       mol_type = protein
                       organism = Gallus gallus
SEQUENCE: 195
DSRVVIQPSP VVVTLPGPIL                                              20
```

```
SEQ ID NO: 196         moltype = AA  length = 23
FEATURE                Location/Qualifiers
source                 1..23
                       mol_type = protein
                       organism = Gallus gallus
SEQUENCE: 196
TAVGSSTSAA VGSILSEEGV PIS                                          23

SEQ ID NO: 197         moltype = AA  length = 22
FEATURE                Location/Qualifiers
source                 1..22
                       mol_type = protein
                       organism = Gallus gallus
SEQUENCE: 197
LRGDVGPVGR TGEQGIAGPP GF                                           22

SEQ ID NO: 198         moltype = AA  length = 21
FEATURE                Location/Qualifiers
source                 1..21
                       mol_type = protein
                       organism = Gallus gallus
SEQUENCE: 198
SRVVIQPSPV VVTLPGPILS S                                            21

SEQ ID NO: 199         moltype = AA  length = 21
FEATURE                Location/Qualifiers
source                 1..21
                       mol_type = protein
                       organism = Gallus gallus
SEQUENCE: 199
VVIQPSPVVV TLPGPILSSF P                                            21

SEQ ID NO: 200         moltype = AA  length = 22
FEATURE                Location/Qualifiers
source                 1..22
                       mol_type = protein
                       organism = Gallus gallus
SEQUENCE: 200
GVPISSGGFG ISGLGSRFSG RR                                           22

SEQ ID NO: 201         moltype = AA  length = 24
FEATURE                Location/Qualifiers
source                 1..24
                       mol_type = protein
                       organism = Gallus gallus
SEQUENCE: 201
SVPIGAGGSL GLGGFGWSGL GRGL                                         24

SEQ ID NO: 202         moltype = AA  length = 21
FEATURE                Location/Qualifiers
source                 1..21
                       mol_type = protein
                       organism = Gallus gallus
SEQUENCE: 202
DSRVVIQPSP VVVTLPGPIL S                                            21

SEQ ID NO: 203         moltype = AA  length = 21
FEATURE                Location/Qualifiers
source                 1..21
                       mol_type = protein
                       organism = Gallus gallus
SEQUENCE: 203
VIQPSPVVVT LPGPILSSFP Q                                            21

SEQ ID NO: 204         moltype = AA  length = 24
FEATURE                Location/Qualifiers
source                 1..24
                       mol_type = protein
                       organism = Gallus gallus
SEQUENCE: 204
AVGSILSEEG VPISSGGFGI SGLG                                         24

SEQ ID NO: 205         moltype = AA  length = 21
FEATURE                Location/Qualifiers
source                 1..21
                       mol_type = protein
                       organism = Gallus gallus
SEQUENCE: 205
RVVIQPSPVV VTLPGPILSS F                                            21
```

```
SEQ ID NO: 206          moltype = AA  length = 23
FEATURE                 Location/Qualifiers
source                  1..23
                        mol_type = protein
                        organism = Gallus gallus
SEQUENCE: 206
SILSEEGVPI SSGGFGISGL GSR                                          23

SEQ ID NO: 207          moltype = AA  length = 21
FEATURE                 Location/Qualifiers
source                  1..21
                        mol_type = protein
                        organism = Gallus gallus
SEQUENCE: 207
IPSSVPESSF KIKGNSSSFH I                                            21

SEQ ID NO: 208          moltype = AA  length = 22
FEATURE                 Location/Qualifiers
source                  1..22
                        mol_type = protein
                        organism = Gallus gallus
SEQUENCE: 208
VAIQPPPVVV TLPGPILSSF PQ                                           22

SEQ ID NO: 209          moltype = AA  length = 25
FEATURE                 Location/Qualifiers
source                  1..25
                        mol_type = protein
                        organism = Gallus gallus
SEQUENCE: 209
TAVGSSTSAA VGSILSEEGV PISSG                                        25

SEQ ID NO: 210          moltype = AA  length = 22
FEATURE                 Location/Qualifiers
source                  1..22
                        mol_type = protein
                        organism = Gallus gallus
SEQUENCE: 210
VVIQPSPVVV TLPGPILSSF PQ                                           22

SEQ ID NO: 211          moltype = AA  length = 23
FEATURE                 Location/Qualifiers
source                  1..23
                        mol_type = protein
                        organism = Gallus gallus
SEQUENCE: 211
PSPVVVTLPG PILSSFPQNT AVG                                          23

SEQ ID NO: 212          moltype = AA  length = 20
FEATURE                 Location/Qualifiers
source                  1..20
                        mol_type = protein
                        organism = Gallus gallus
SEQUENCE: 212
KENFEVLCKD GTRKPVTDAE                                              20

SEQ ID NO: 213          moltype = AA  length = 21
FEATURE                 Location/Qualifiers
source                  1..21
                        mol_type = protein
                        organism = Gallus gallus
SEQUENCE: 213
SIQACKLAQS HGWGVMVSHR S                                            21

SEQ ID NO: 214          moltype = AA  length = 22
FEATURE                 Location/Qualifiers
source                  1..22
                        mol_type = protein
                        organism = Gallus gallus
SEQUENCE: 214
SRVVIQPSPV VVTLPGPILS SF                                           22

SEQ ID NO: 215          moltype = AA  length = 22
FEATURE                 Location/Qualifiers
source                  1..22
                        mol_type = protein
                        organism = Gallus gallus
SEQUENCE: 215
```

```
RVVIQPSPVV VTLPGPILSS FP                                         22

SEQ ID NO: 216         moltype = AA  length = 23
FEATURE                Location/Qualifiers
source                 1..23
                       mol_type = protein
                       organism = Gallus gallus
SEQUENCE: 216
EQPPLCVASV SVKEPASETP AVP                                        23

SEQ ID NO: 217         moltype = AA  length = 23
FEATURE                Location/Qualifiers
source                 1..23
                       mol_type = protein
                       organism = Gallus gallus
SEQUENCE: 217
SVAIQPPPVV VTLPGPILSS FPQ                                        23

SEQ ID NO: 218         moltype = AA  length = 26
FEATURE                Location/Qualifiers
source                 1..26
                       mol_type = protein
                       organism = Gallus gallus
SEQUENCE: 218
SAAVGSILSE EGVPISSGGF GISGLG                                     26

SEQ ID NO: 219         moltype = AA  length = 24
FEATURE                Location/Qualifiers
source                 1..24
                       mol_type = protein
                       organism = Gallus gallus
SEQUENCE: 219
SILSEEGVPI SSGGFGISGL GSRF                                       24

SEQ ID NO: 220         moltype = AA  length = 24
FEATURE                Location/Qualifiers
source                 1..24
                       mol_type = protein
                       organism = Gallus gallus
SEQUENCE: 220
PSPVVVTLPG PILSSFPQNT AVGS                                       24

SEQ ID NO: 221         moltype = AA  length = 23
FEATURE                Location/Qualifiers
source                 1..23
                       mol_type = protein
                       organism = Gallus gallus
SEQUENCE: 221
VVIQPSPVVV TLPGPILSSF PQN                                        23

SEQ ID NO: 222         moltype = AA  length = 23
FEATURE                Location/Qualifiers
source                 1..23
                       mol_type = protein
                       organism = Gallus gallus
SEQUENCE: 222
SRVVIQPSPV VVTLPGPILS SFP                                        23

SEQ ID NO: 223         moltype = AA  length = 24
FEATURE                Location/Qualifiers
source                 1..24
                       mol_type = protein
                       organism = Gallus gallus
SEQUENCE: 223
SSVAIQPPPV VVTLPGPILS SFPQ                                       24

SEQ ID NO: 224         moltype = AA  length = 23
FEATURE                Location/Qualifiers
source                 1..23
                       mol_type = protein
                       organism = Gallus gallus
SEQUENCE: 224
RVVIQPSPVV VTLPGPILSS FPQ                                        23

SEQ ID NO: 225         moltype = AA  length = 25
FEATURE                Location/Qualifiers
source                 1..25
                       mol_type = protein
                       organism = Gallus gallus
```

```
SEQUENCE: 225
SILSEEGVPI SSGGFGISGL GSRFS                                   25

SEQ ID NO: 226         moltype = AA  length = 27
FEATURE                Location/Qualifiers
source                 1..27
                       mol_type = protein
                       organism = Gallus gallus
SEQUENCE: 226
TSAAVGSILS EEGVPISSGG FGISGLG                                 27

SEQ ID NO: 227         moltype = AA  length = 26
FEATURE                Location/Qualifiers
source                 1..26
                       mol_type = protein
                       organism = Gallus gallus
SEQUENCE: 227
SILSEEGVPI SSGGFGISGL GSRFSG                                  26

SEQ ID NO: 228         moltype = AA  length = 24
FEATURE                Location/Qualifiers
source                 1..24
                       mol_type = protein
                       organism = Gallus gallus
SEQUENCE: 228
SRVVIQPSPV VVTLPGPILS SFPQ                                    24

SEQ ID NO: 229         moltype = AA  length = 28
FEATURE                Location/Qualifiers
source                 1..28
                       mol_type = protein
                       organism = Gallus gallus
SEQUENCE: 229
TAVGSSTSAA VGSILSEEGV PISSGGFG                                28

SEQ ID NO: 230         moltype = AA  length = 28
FEATURE                Location/Qualifiers
source                 1..28
                       mol_type = protein
                       organism = Gallus gallus
SEQUENCE: 230
STSAAVGSIL SEEGVPISSG GFGISGLG                                28

SEQ ID NO: 231         moltype = AA  length = 24
FEATURE                Location/Qualifiers
source                 1..24
                       mol_type = protein
                       organism = Gallus gallus
SEQUENCE: 231
RVVIQPSPVV VTLPGPILSS FPQN                                    24

SEQ ID NO: 232         moltype = AA  length = 25
FEATURE                Location/Qualifiers
source                 1..25
                       mol_type = protein
                       organism = Gallus gallus
SEQUENCE: 232
SRVVIQPSPV VVTLPGPILS SFPQN                                   25

SEQ ID NO: 233         moltype = AA  length = 25
FEATURE                Location/Qualifiers
source                 1..25
                       mol_type = protein
                       organism = Gallus gallus
SEQUENCE: 233
DSRVVIQPSP VVVTLPGPIL SSFPQ                                   25

SEQ ID NO: 234         moltype = AA  length = 29
FEATURE                Location/Qualifiers
source                 1..29
                       mol_type = protein
                       organism = Gallus gallus
SEQUENCE: 234
TAVGSSTSAA VGSILSEEGV PISSGGFGI                               29

SEQ ID NO: 235         moltype = AA  length = 29
FEATURE                Location/Qualifiers
source                 1..29
                       mol_type = protein
```

```
                         organism = Gallus gallus
SEQUENCE: 235
SAAVGSILSE EGVPISSGGF GISGLGSRF                                         29

SEQ ID NO: 236           moltype = AA  length = 24
FEATURE                  Location/Qualifiers
source                   1..24
                         mol_type = protein
                         organism = Gallus gallus
SEQUENCE: 236
VEQLVNLQHL DVAYNLLLEH AQLA                                              24

SEQ ID NO: 237           moltype = AA  length = 28
FEATURE                  Location/Qualifiers
source                   1..28
                         mol_type = protein
                         organism = Gallus gallus
SEQUENCE: 237
SVAIQPPPVV VTLPGPILSS FPQSTAVG                                          28

SEQ ID NO: 238           moltype = AA  length = 28
FEATURE                  Location/Qualifiers
source                   1..28
                         mol_type = protein
                         organism = Gallus gallus
SEQUENCE: 238
SILSEEGVPI SSGGFGISGL GSRFSGRR                                          28

SEQ ID NO: 239           moltype = AA  length = 30
FEATURE                  Location/Qualifiers
source                   1..30
                         mol_type = protein
                         organism = Gallus gallus
SEQUENCE: 239
TSAAVGSILS EEGVPISSGG FGISGLGSRF                                        30

SEQ ID NO: 240           moltype = AA  length = 29
FEATURE                  Location/Qualifiers
source                   1..29
                         mol_type = protein
                         organism = Gallus gallus
SEQUENCE: 240
SSVAIQPPPV VVTLPGPILS SFPQSTAVG                                         29

SEQ ID NO: 241           moltype = AA  length = 31
FEATURE                  Location/Qualifiers
source                   1..31
                         mol_type = protein
                         organism = Gallus gallus
SEQUENCE: 241
STSAAVGSIL SEEGVPISSG GFGISGLGSR F                                      31

SEQ ID NO: 242           moltype = AA  length = 31
FEATURE                  Location/Qualifiers
source                   1..31
                         mol_type = protein
                         organism = Gallus gallus
SEQUENCE: 242
PSPVVVTLPG PILSSFPQNT AVGSSTSAAV G                                      31

SEQ ID NO: 243           moltype = AA  length = 33
FEATURE                  Location/Qualifiers
source                   1..33
                         mol_type = protein
                         organism = Gallus gallus
SEQUENCE: 243
TAVGSSTSAA VGSILSEEGV PISSGGFGIS GLG                                    33

SEQ ID NO: 244           moltype = AA  length = 31
FEATURE                  Location/Qualifiers
source                   1..31
                         mol_type = protein
                         organism = Gallus gallus
SEQUENCE: 244
AVGSILSEEG VPISSGGFGI SGLGSRFSGR R                                      31

SEQ ID NO: 245           moltype = AA  length = 27
FEATURE                  Location/Qualifiers
source                   1..27
```

```
                      mol_type = protein
                      organism = Gallus gallus
SEQUENCE: 245
NKVLVHCAMG RSRSATLVLA YLMIYKN                                   27

SEQ ID NO: 246        moltype = AA  length = 32
FEATURE               Location/Qualifiers
source                1..32
                      mol_type = protein
                      organism = Gallus gallus
SEQUENCE: 246
SSVAIQPPPV VVTLPGPILS SFPQSTAVGS TA                             32

SEQ ID NO: 247        moltype = AA  length = 32
FEATURE               Location/Qualifiers
source                1..32
                      mol_type = protein
                      organism = Gallus gallus
SEQUENCE: 247
AAVGSILSEE GVPISSGGFG ISGLGSRFSG RR                             32

SEQ ID NO: 248        moltype = AA  length = 35
FEATURE               Location/Qualifiers
source                1..35
                      mol_type = protein
                      organism = Gallus gallus
SEQUENCE: 248
TAVGSSTSAA VGSILSEEGV PISSGGFGIS GLGSR                          35

SEQ ID NO: 249        moltype = AA  length = 33
FEATURE               Location/Qualifiers
source                1..33
                      mol_type = protein
                      organism = Gallus gallus
SEQUENCE: 249
SAAVGSILSE EGVPISSGGF GISGLGSRFS GRR                            33

SEQ ID NO: 250        moltype = AA  length = 34
FEATURE               Location/Qualifiers
source                1..34
                      mol_type = protein
                      organism = Gallus gallus
SEQUENCE: 250
PSPVVVTLPG PILSSFPQNT AVGSSTSAAV GSIL                           34

SEQ ID NO: 251        moltype = AA  length = 35
FEATURE               Location/Qualifiers
source                1..35
                      mol_type = protein
                      organism = Gallus gallus
SEQUENCE: 251
PSPVVVTLPG PILSSFPQNT AVGSSTSAAV GSILS                          35

SEQ ID NO: 252        moltype = AA  length = 36
FEATURE               Location/Qualifiers
source                1..36
                      mol_type = protein
                      organism = Gallus gallus
SEQUENCE: 252
TAVGSSTSAA VGSILSEEGV PISSGGFGIS GLGSRF                         36

SEQ ID NO: 253        moltype = AA  length = 29
FEATURE               Location/Qualifiers
source                1..29
                      mol_type = protein
                      organism = Gallus gallus
SEQUENCE: 253
RPRVYLHCTN PRHPKYREGD VTLFALNLS                                 29
```

METHOD OF USING/APPLYING A KERATIN HYDROLYSIS PEPTIDE SOLUTION TO IMPROVE THE FERTILIZER USAGE EFFICIENCY IN COTTON

PRIORITY CLAIM TO FOREIGN APPLICATION

Applicant hereby makes priority claim to a Taiwan application, number 112138605 having the Taiwan filing date of Oct. 6, 2023.

BACKGROUND OF THE INVENTION

Present invention disclosed and claimed the method and application of a keratin hydrolysis peptide ("KHP") solution for improving the fertilizer utilization and absorption by cotton plants, by using the thermally hydrolyzed feather keratin peptide solution to the soil when the cotton seeds are sowed.

With the application of the KHP solution as disclosed herein, the amount of fertilizer usage can be reduced while the efficiency of photo synthesis, the growth of root systems and above-ground biomass of cotton plants are improved.

The KHP solution is made by a hydrolysis process using feathers and water, with one version of the solution using feathers only, via a high-temperature and high-pressure process, resulting in a solution that has many beneficial applications in the fields of horticulture, agriculture and potentially other farming businesses.

Hydrolyzed keratin has long been used to strengthen hairs, reduce hair splitting and breakage. Other beneficial uses include skin moisturization and wound healing. Keratin hydrolysate has also been known to function as a biofertilizer, boosting plants' growth by enhancing the plants' ability to receive and utilize nutrients, including commonly applied fertilizers.

Cotton, belonging in the Malvaceae Family, is a perennial plant that favors warm weathers with lots of lights. Wet and damp environment, on the other hand, is not ideal for cotton's growth. When grown in deep and loose soil with proper nutrients supply, the reproductive growth and developmental growth will simultaneously happen, producing new stems/leaves and buds/flowers. However, to keep up with such reproductive and developmental growths, sufficient and proper management of fertilizers becomes very important.

Various studies have shown that, given the common NPK fertilization adopted by most farmers, only less than 30-50% of the fertilizers were actually absorbed by the cotton plants, with the majority being wasted, or, worse, causing long-term negative impact to the environment.

Guided by the new concept of Fertilizer Use Efficiency (FUE), as a new benchmark in assessing/evaluating how people should use fertilizers to increase agricultural production, the inventors of present application developed a KHP solution that can be mixed to a fertilizer, used sparingly, to improve the fertilizer intake and absorption by the cotton plants with healthier growth and development. By the application of the KHP solution as disclosed herein, the goal of reducing the fertilizer use without reducing the production yield is reached.

SUMMARY OF THE INVENTION

The keratin solution is primarily based upon feather, which contains 85-91% keratin, 13-15% organic nitrogen, 1.6-2% organic sulfur, as well as other materials. The high keratin content has drawn many prior researches that work to break down, by enzyme, chemical agents, or fermentation process, into peptides, amino acids and other smaller molecules that can be used for animal feeds, plant fertilizers, and cultivation bases.

Around 2019, Nurdiawati, et al, came up with a hydrolysis process, by the mixture of α-amylase and protease to hydrolyze feather waste, resulting in a mixture of amino acids, fatty acids, and sugars. Nurdiawati experimented and adopted certain specific high-temperature and high-pressure setting in the hydrolysis process and discovered that the resulting solution, when mixed with some potassium and other minerals, can boost the growth of Pogostemon cablin and *Vigna radiata*, as reported in International Journal of Recycling or Organic Waste in Agriculture (8:221-232, 2019).

The inventors of present application, under the aegis of CH Biotech, developed different feather and water compositions, performed the hydrolysis at higher temperature (not higher than 200° C.) and higher pressure setting, resulting with a different keratin hydrolysis peptide ("KHP") solution. The KHP solution can be used on different crops/plants, including the cotton plants that are grown with reduced application of fertilizer, thus boosting the intake/absorption of the fertilizers.

The present invention can choose different mixtures of water and feathers and subject the mixtures to a thermal hydrolysis process to create a solution having molecular mass of 593.3-3,828 Dalton and containing at least 253 peptides as confirmed by using a mass spectrometer.

The inventors used the spectrometer Dionex UltiMate 3000 UPLC to separate the peptides; an analysis is done via Thermo Orbitrap Fushion Lumos Tribrid Orbitrap mass spectrometry to identify the peptides, which are then subsequently confirmed by looking up the BIOPEP-UWM database.

The solution then is applied to the fertilized soil in which the cotton seeds are planted.

The solution can be diluted by water, at 100 to 500 ratio by volume, and then applied to the soil in which the cotton seeds are planted.

A specific water dilution of 1:100 ratio by volume is adopted in carrying out the field tests and has been proven to be effective.

BRIEF DESCRIPTION OF DRAWINGS

The accompanying drawings, figures and tables, which are incorporated in and constitute a part of this specification, illustrate and exemplify the preferred embodiments of the invention. Together with the description, serve to explain the principles of the invention.

FIGS. 1A-1G collectively constitute Table I (in Sequence Listing XML format), which shows the at least 253 peptides and their annotated sequences for the solution generated in accordance with the disclosure of this application. The Sequence Listing XML file complies with the WIPO ST.26 requirements and is to be incorporated by reference in the specification in its entirety.

The Sequence Listing XML file is identified as follows:

File name: Table-I-253_sequence—63237-20

Created on: Mar. 17, 2024

Size: 216 KB

Figure 2:
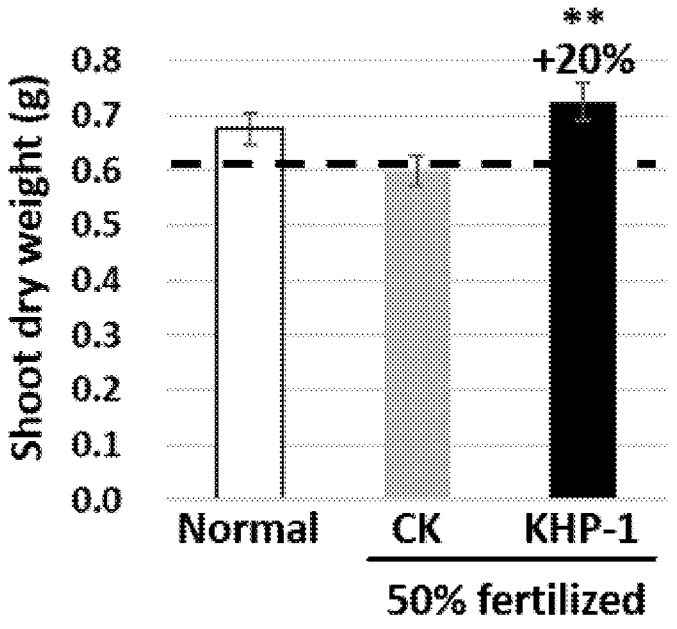

FIG. 2 shows the comparison of dry weight of the above-ground biomass among the 3 groups: normal, check (CK) and KHP-1.

Figure 3A:
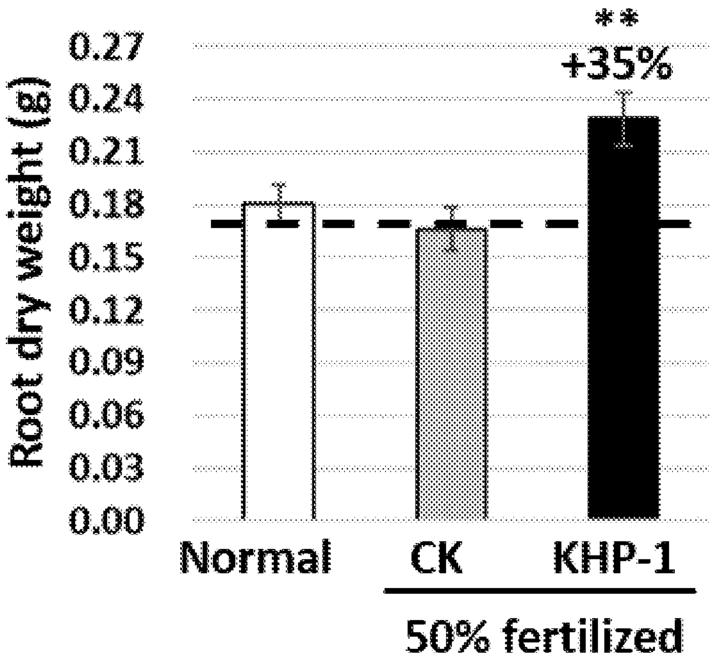

FIG. 3A shows comparison among the three groups regarding the dry weights of the root systems.

Figure 3B:
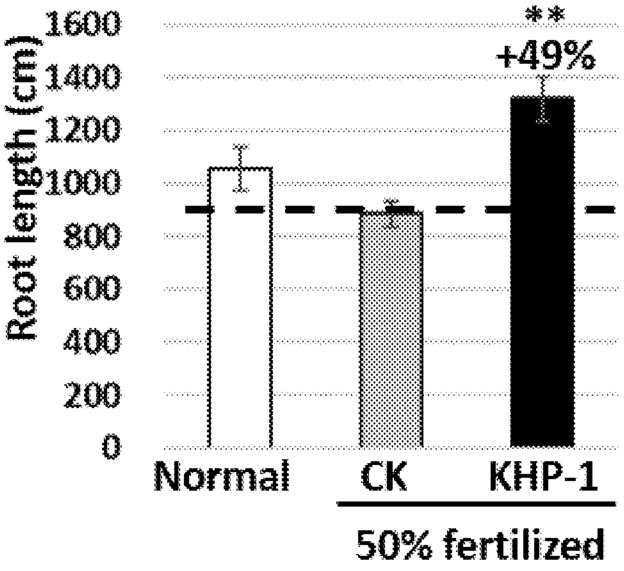

FIG. 3B shows comparison among the three groups regarding the root lengths.

DETAILED DESCRIPTION OF THE INVENTION

The keratin hydrolysis peptide ("KHP") solution of present invention is made by a high-temperature and high-pressure process to treat a mixture of water and feathers at different weight ratios, and at different temperatures and pressure settings.

The KHP solution herein can be made with three (3) sets of parameters, as disclosed herein.

| | Feather Weight (kg) | Water Weight (kg) | Water Content in Feathers % | Presure (kg/cm2) | Temp (°C) | Time (min) | Mass (Dalton) | Concentr. (ppm) |
|---|---|---|---|---|---|---|---|---|
| KHP-1 | 66 | 44 | 50% | 16 | 195 | 40 | 593.3~3828.0 | 200000 |
| | 50 | 40 | 50% | 12 | 185 | 80 | 593.3~3508.9 | 301500 |
| | 70 | 0 | 46% | 13 | 180 | 40 | 705.9~3194.7 | 381250 |

The hydrolysis process of present invention selected the third parameter (70 kg of feathers, no water) and takes the steps of:

a. Preparing the KHP solution by putting 70 kg of feathers whose content is 46% water in a sealed container;
b. hydrolyzing the mixture in the container with a temperature and pressure setting of 180° C. and 13 kg/cm$^2$ for a duration of 40 minutes;
c. using a mass spectrometer to confirm the combination of peptides in the solution to contain at least 253 peptides as listed in the specification where their molecular masses are between 705 and 3,195 Daltons, and the concentration is in the range of $3.0\times10^5$~$4.5\times10^5$ ppm;
d. applying the solution to lightly fertilized soil around cotton plants.

The confirmation of some of the bioactive 253 peptides is further done by referencing the BIOPEP-UWM database.

The KHP solution made using the third parameter (70 kg of feathers and no water) as described above will be referred to as KHP-1 solution.

The inventors conducted field tests of the KHP-1 solution using the cotton species of Deltapine 1646 B2XF, planted into normal seeding pots where the soil is suitably mixed with a common fertilizer (Taifei Heiwonte 43), with the growth condition of day time temperature 28° C., night time temperature 25° C.; day light hours of 16 and night time hours of 8.

Depending on the fertilizer usage, three (3) groups of cotton planting are carried out: Normal, Check (CK), and KHP-1. There are 9 pots of cotton plants in each group.

The normal group is the 100% fertilizer group where 1.6 g of the common fertilizer is mixed with 100 ml of water and infused into the soil.

The CK group is 50% fertilizer group where 0.8 g of the common fertilizer is mixed with 100 ml of water and infused into the soil. The 50% reduced use of the common fertilizer fits the new benchmark of FUE where even the fertilizer is only lightly used, the plants' growth, development and production are not negatively affected with the application of the KHP solution as disclosed herein.

The KHP-1 group is also 50% fertilizer group where 0.8 g of the common fertilizer is mixed with 100 ml of water, with the addition of 1 ml of KHP-1 solution, and then infused into the soil.

The chart below summarized the fertilizer and the KHP solution usage (100× means dilution by water at ratio of 1:100):

| | Normal | Ck | KHP-1 |
|---|---|---|---|
| KHP-1 | 0 | 0 | 1 ml (100x dilution) |
| Fertilizer Amount | 1.6 g | 0.8 g | 0.8 g |
| Fertilizer Grouping | 100% fertilized | 50% fertilized | |

On the 21$^{th}$ day after the cotton seeds were planted, the young plants from all three groups are then removed from the pots, cleaned off the dirt/soil from the roots and the above-ground portion for taking different measurements as stated below.

For the above-ground biomass, the dry weights from each group are measured and noted in FIG. 2. It can be seen that the KHP-1 group has 20% more weight than the check group (50% fertilizer used).

For the root system's development, the measurements on dry weights and lengths all show that the use of KHP-1 solution substantially boosted the growth compared to that of the Normal group and of the Check (CK) group.

As has been proven by the field tests, and the scientific analysis/measurement done by the inventors, the method of creating the KHP solution and the method of application to cotton plants, even at 100× dilution, will help with improving the fertilizer efficacy and, consequently, reducing the fertilizer usage overall.

While the disclosure herein gave limited teachings and embodiment examples, it should be noted that the description and disclosure made herein illustrated the preferred embodiments of the invention and are not meant to limit the scope of the applicant's rights. Variations and alterations may be employed for yet additional embodiments without departing from the scope of the invention herein.

TABLE I

| | Peptide Sequence | Peptide mass (Da) |
|---|---|---|
| 1 | PheGlyLeuSerGlyLeu | 593.33 |
| 2 | AlaAlaValGlySerSerLeu | 604.33 |
| 3 | ThrAlaValGlySerSerThr | 622.30 |
| 4 | LeuSerLeuSerSerGln | 634.34 |
| 5 | PheGlyIleSerGlyLeuGly | 650.35 |
| 6 | ProIleLeuSerSerPhe | 663.37 |
| 7 | SerLeuLeuSerGlnGlyAla | 675.37 |
| 8 | PheAsnLeuArgGlyAla | 677.37 |
| 9 | SerAlaAlaValGlySerSerLeu | 691.36 |
| 10 | SerArgValValIleGln | 701.43 |
| 11 | SerArgValValLeuGlu | 702.41 |
| 12 | GlyPheGlyIleSerGlyLeuGly | 707.37 |
| 13 | SerArgPheSerGlyArg | 709.37 |
| 14 | ArgValValIleGlnPro | 711.45 |
| 15 | SerAlaAlaValGlySerIleLeu | 717.41 |
| 16 | IleValValIleGlyHisVal | 736.47 |
| 17 | ThrAlaValGlySerSerThrSerAla | 780.37 |
| 18 | ArgValValIleGlnProSer | 798.48 |
| 19 | SerArgValValIleGlnPro | 798.48 |
| 20 | ProGlnGlyGluGlnLeuGln | 799.39 |
| 21 | ArgAlaGlyAlaGlyProProSerPro | 809.43 |
| 22 | AspSerArgValValIleGln | 816.46 |
| 23 | ProGlyProIleLeuSerSerPhe | 817.45 |
| 24 | ProIleSerSerGlyGlyPheGlyIle | 834.44 |
| 25 | IleSerGlyLeuGlySerArgPhe | 836.46 |
| 26 | SerGlyGlyPheGlyIleSerGlyLeuGly | 851.43 |
| 27 | SerArgPheSerGlyArgArg | 865.48 |
| 28 | ProGlyLeuAlaLeuProValLeuPro | 876.56 |
| 29 | SerArgValValIleGlnProSer | 885.52 |
| 30 | ProIleLeuSerSerPheProGln | 888.48 |
| 31 | LeuGlySerGlyIlePheTrpIle | 892.49 |
| 32 | GlyIleSerGlyLeuGlySerArgPhe | 893.48 |
| 33 | ValValValThrLeuProGlyProIle | 894.57 |
| 34 | CysArgLeuSerLeuSerGlnPro | 903.47 |
| 35 | SerAlaAlaValGlySerSerLeuSerAlaGly | 906.45 |
| 36 | AlaValGlySerSerThrSerAlaAlaValGly | 906.45 |
| 37 | ValValThrLeuProGlyProIleLeu | 908.58 |
| 38 | ProGlyProIleLeuSerSerPhePro | 914.50 |
| 39 | SerAlaAlaValGlySerIleLeuSerGlu | 933.49 |

TABLE I-continued

| | Peptide Sequence | Peptide mass (Da) |
|---|---|---|
| 40 | ValProIleSerSerGlyGlyPheGlyIle | 933.50 |
| 41 | GlnLeuAlaGlnArgAsnThrIle | 943.53 |
| 42 | LeuSerGlyLeuArgSerAsnLeuSer | 946.53 |
| 43 | ProSerProValValValThrLeuProGly | 965.57 |
| 44 | ProProProValValValThrLeuProGly | 975.59 |
| 45 | IleSerGlyLeuGlySerArgPheSerGly | 980.52 |
| 46 | LeuAlaLeuArgGlnSerValGluAla | 986.56 |
| 47 | ProLeuLeuGlyProProLeuLeuGlyIle | 989.64 |
| 48 | ValValThrLeuProGlyProIleLeuSer | 995.61 |
| 49 | ValThrLeuGluAspLeuArgArg | 1001.57 |
| 50 | ProIleLeuSerSerPheProGlnAsn | 1002.53 |
| 51 | ProIleLeuSerSerPheProGlnAsp | 1003.51 |
| 52 | GlyThrValGlyValSerAlaGlyValThrArg | 1003.55 |
| 53 | PheGlyLeuSerArgValThrLeuAsn | 1006.57 |
| 54 | ThrAlaValGlySerSerThrSerAlaAlaValGly | 1007.50 |
| 55 | ValValValThrLeuProGlyProIleLeu | 1007.65 |
| 56 | ProProValValValThrPheProGlyPro | 1009.57 |
| 57 | ProProProValValValThrPheProGly | 1009.57 |
| 58 | ValValIleGlnProSerProValValVal | 1036.64 |
| 59 | PheGlyIleSerGlyLeuGlySerArgPhe | 1040.55 |
| 60 | ProGlyProIleLeuSerSerPheProGln | 1042.56 |
| 61 | PheGlyTrpSerGlyLeuGlyArgGlyLeu | 1049.55 |
| 62 | LeuGluAlaGlnLeuSerGluLeuArg | 1058.58 |
| 63 | IleValGlyAlaTrpTyrThrValArg | 1064.59 |
| 64 | LeuLeuSerProProGlyLeuProGlyLeuLeu | 1076.67 |
| 65 | ValValValThrLeuProGlyProIleLeuSer | 1094.68 |
| 66 | GlyPheGlyIleSerGlyLeuGlySerArgPhe | 1097.57 |
| 67 | ProValValValThrLeuProGlyProIleLeu | 1104.70 |
| 68 | ValSerGlnGlyGluIleThrValProSerIle | 1129.61 |
| 69 | SerIleLeuSerGluGluGlyValProIleSer | 1130.59 |
| 70 | ProValValValThrPheProGlyProIleLeu | 1138.69 |
| 71 | ProIleSerSerGlyGlyPheGlyIleSerGlyLeuGly | 1148.59 |
| 72 | ValGlySerSerThrSerAlaAlaValGlySerIleLeu | 1148.62 |
| 73 | GlyPheLeuSerSerAlaValSerLeuAsnArg | 1150.62 |
| 74 | GlyGlyPheGlyIleSerGlyLeuGlySerArgPhe | 1154.60 |
| 75 | ProGlyProIleLeuSerSerPheProGlnAsn | 1156.60 |
| 76 | ProGlyProIleLeuSerSerPheProGlnAsp | 1157.58 |
| 77 | GlyGlyPheGlyTrpSerGlyLeuGlyArgGlyLeu | 1163.60 |

TABLE I-continued

| | Peptide Sequence | Peptide mass (Da) |
|---|---|---|
| 78 | ProSerProValValValThrLeuProGlyProIle | 1175.70 |
| 79 | ValValValThrLeuProGlyProIleLeuSerSer | 1181.71 |
| 80 | ProValValValThrLeuProGlyProIleLeuSer | 1191.73 |
| 81 | SerProValValValThrLeuProGlyProIleLeu | 1191.73 |
| 82 | ArgValValIleGlnProSerProValValVal | 1192.74 |
| 83 | GlnAlaLeuThrGluValTyrAlaLysAlaAsn | 1207.63 |
| 84 | IleGluThrLeuThrGlnPheLeuGlyTrp | 1207.64 |
| 85 | GlyPheGlySerArgSerLeuValGlyLeuGlyGlyThr | 1207.64 |
| 86 | AlaValGlySerSerThrSerAlaAlaValGlySerIleLeu | 1219.65 |
| 87 | ProValValValThrPheProGlyProIleLeuSer | 1225.72 |
| 88 | ValGlySerSerThrSerAlaAlaValGlySerIleLeuSer | 1235.65 |
| 89 | GlyPheGlyIleSerGlyLeuGlySerArgPheSerGly | 1241.63 |
| 90 | SerGlyGlyPheGlyIleSerGlyLeuGlySerArgPhe | 1241.63 |
| 91 | ValProIleSerSerGlyGlyPheGlyIleSerGlyLeuGly | 1247.66 |
| 92 | ValValIleGlnProSerProValValValThrLeu | 1250.77 |
| 93 | SerIleLeuSerGluGluGlyValProIleSerSerGly | 1274.65 |
| 94 | ValMetGlyCysLysAlaAlaGlyAlaSerArgIleIle | 1276.69 |
| 95 | SerProValValValThrLeuProGlyProIleLeuSer | 1278.77 |
| 96 | SerArgValValIleGlnProSerProValValVal | 1279.77 |
| 97 | ProSerProValValValThrLeuProGlyProIleLeu | 1288.79 |
| 98 | ArgValValIleGlnProSerProValValValThr | 1293.79 |
| 99 | ProProProValValValThrLeuProGlyProIleLeu | 1298.81 |
| 100 | GlyValProIleSerSerGlyGlyPheGlyIleSerGlyLeuGly | 1304.68 |
| 101 | ValIleGlnProSerProValValValThrLeuProGly | 1305.78 |
| 102 | AlaValGlySerSerThrSerAlaAlaValGlySerIleLeuSer | 1306.68 |
| 103 | ThrAlaValGlySerSerThrSerAlaAlaValGlySerIleLeu | 1320.70 |
| 104 | SerGlyGlyPheGlyIleSerGlyLeuGlySerArgPheSer | 1328.66 |
| 105 | ValValValThrLeuProGlyProIleLeuSerSerPhe | 1328.78 |
| 106 | ProProProValValValThrPheProGlyProIleLeu | 1332.79 |
| 107 | GlyLeuGlyGlyPheGlyTrpSerGlyLeuGlyArgGlyLeu | 1333.70 |
| 108 | ValThrLeuProGlyProIleLeuSerSerPheProGln | 1355.76 |
| 109 | AlaValGlySerIleLeuSerGluGluGlyValProIleSer | 1357.72 |
| 110 | SerLeuGlyLeuGlyGlyPheGlyTrpSerGlyLeuGlyArg | 1363.71 |
| 111 | ProSerProValValValThrLeuProGlyProIleLeuSer | 1375.82 |
| 112 | SerArgValValIleGlnProSerProValValValThr | 1380.82 |
| 113 | SerGlyGlyPheGlyIleSerGlyLeuGlySerArgPheSerGly | 1385.68 |
| 114 | ProProProValValValThrLeuProGlyProIleLeuSer | 1385.84 |
| 115 | ValAlaIleGlnProProProValValValThrLeuProGly | 1386.84 |
| 116 | ProIleSerSerGlyGlyPheGlyIleSerGlyLeuGlySerArg | 1391.73 |

TABLE I-continued

| | Peptide Sequence | Peptide mass (Da) |
|---|---|---|
| 117 | ProIleValAspValAlaGluAlaLeuLeuHisValLys | 1403.83 |
| 118 | ValValIleGlnProSerProValValValThrLeuProGly | 1404.85 |
| 119 | ArgValValIleGlnProSerProValValValThrLeu | 1406.87 |
| 120 | ThrAlaValGlySerSerThrSerAlaAlaValGlySerIleLeuSer | 1407.73 |
| 121 | ProProProValValValThrPheProGlyProIleLeuSer | 1419.82 |
| 122 | SerLeuGlyLeuGlyGlyPheGlyTrpSerGlyLeuGlyArgGly | 1420.73 |
| 123 | ValValValThrLeuProGlyProIleLeuSerSerPhePro | 1425.84 |
| 124 | ProValValValThrLeuProGlyProIleLeuSerSerPhe | 1425.84 |
| 125 | AlaAlaValGlySerIleLeuSerGluGluGlyValProIleSer | 1428.76 |
| 126 | SerAlaAlaValGlySerIleLeuSerGluGluGlyValProIle | 1428.76 |
| 127 | GluGlyValProIleSerSerGlyGlyPheGlyIleSerGlyLeuGly | 1433.73 |
| 128 | ValValThrLeuProGlyProIleLeuSerSerPheProGln | 1454.83 |
| 129 | ProSerProValValValThrLeuProGlyProIleLeuSerSer | 1462.85 |
| 130 | GlyLysAspGlyProLysGlyValArgGlyAspAlaGlyProProGly | 1464.76 |
| 131 | SerValAlaIleGlnProProProValValValThrLeuProGly | 1473.87 |
| 132 | SerArgValValIleGlnProSerProValValValThrLeu | 1493.90 |
| 133 | LeuHisThrGluAlaAlaAlaThrValProAspArgSerGlu | 1496.73 |
| 134 | ValValIleGlnProSerProValValValThrLeuProGlyPro | 1501.90 |
| 135 | ArgValValIleGlnProSerProValValValThrLeuPro | 1503.93 |
| 136 | SerAlaAlaValGlySerIleLeuSerGluGluGlyValProIleSer | 1515.79 |
| 137 | ProValValValThrLeuProGlyProIleLeuSerSerPhePro | 1522.89 |
| 138 | IleGlnProSerProValValValThrLeuProGlyProIleLeu | 1529.93 |
| 139 | SerValProIleGlyAlaGlyGlySerLeuGlyLeuGlyGlyPheGlyTrp | 1531.79 |
| 140 | SerLeuGlyLeuGlyGlyPheGlyTrpSerGlyLeuGlyArgGlyLeu | 1533.82 |
| 141 | PheGlyGlyGlyPheGlyGlyGlyAspGlyIleLeuProAlaGlyGluLys | 1535.75 |
| 142 | ThrAlaValGlySerSerThrSerAlaAlaValGlySerIleLeuSerGlu | 1536.78 |
| 143 | ProIleSerSerGlyGlyPheGlyIleSerGlyLeuGlySerArgPhe | 1538.80 |
| 144 | SerAlaAlaValGlySerSerLeuSerAlaGlySerValProIleGlyAlaGlyGly | 1544.79 |
| 145 | GlyValProIleSerSerGlyGlyPheGlyIleSerGlyLeuGlySerArg | 1547.82 |
| 146 | ValValValThrLeuProGlyProIleLeuSerSerPheProGln | 1553.89 |
| 147 | ArgValValIleGlnProSerProValValValThrLeuProGly | 1560.95 |
| 148 | SerArgValValIleGlnProSerProValValValThrLeuPro | 1590.96 |
| 149 | ProSerProValValValThrLeuProGlyProIleLeuSerSerPhe | 1609.92 |
| 150 | AlaIleGlnProProProValValValThrLeuProGlyProIleLeu | 1610.99 |
| 151 | IlcGlnProSerProValValValThrLeuProGlyProIleLeuSer | 1616.96 |
| 152 | ValIleGlnProSerProValValValThrLeuProGlyProIleLeu | 1629.00 |
| 153 | ValProIleSerSerGlyGlyPheGlyIleSerGlyLeuGlySerArgPhe | 1637.86 |
| 154 | SerArgValValIleGlnProSerProValValValThrLeuProGly | 1647.98 |

TABLE I-continued

| | Peptide Sequence | Peptide mass (Da) |
|---|---|---|
| 155 | SerIleLeuSerGluGluGlyValProIleSerSerGlyGlyPheGlyIle | 1648.84 |
| 156 | ProValValValThrLeuProGlyProIleLeuSerSerPheProGln | 1650.95 |
| 157 | ArgValValIleGlnProSerProValValValThrLeuProGlyPro | 1658.00 |
| 158 | SerAlaAlaValGlySerIleLeuSerGluGluGlyValProIleSerSerGly | 1659.84 |
| 159 | ValValValThrLeuProGlyProIleLeuSerSerPheProGlnAsn | 1667.94 |
| 160 | GlyValProIleSerSerGlyGlyPheGlyIleSerGlyLeuGlySerArgPhe | 1694.89 |
| 161 | ProSerProValValValThrLeuProGlyProIleLeuSerSerPhePro | 1706.97 |
| 162 | ValAlaIleGlnProProProValValValThrLeuProGlyProIleLeu | 1710.06 |
| 163 | ValIleGlnProSerProValValValThrLeuProGlyProIleLeuSer | 1716.03 |
| 164 | ValValIleGlnProSerProValValValThrLeuProGlyProIleLeu | 1728.07 |
| 165 | SerProValValValThrLeuProGlyProIleLeuSerSerPheProGln | 1737.98 |
| 166 | ValIleLeuSerAsnThrLysThrGlnTyrSerIleLysIleHis | 1745.00 |
| 167 | SerArgValValIleGlnProSerProValValValThrLeuProGlyPro | 1745.03 |
| 168 | AspSerArgValValIleGlnProSerProValValValThrLeuProGly | 1763.01 |
| 169 | ProValValValThrLeuProGlyProIleLeuSerSerPheProGlnAsn | 1764.99 |
| 170 | ArgValValIleGlnProSerProValValValThrLeuProGlyProIle | 1771.08 |
| 171 | GlyValProIleSerSerGlyGlyPheGlyIleSerGlyLeuGlySerArgPheSer | 1781.92 |
| 172 | SerValAlaIleGlnProProProValValValThrLeuProGlyProIleLeu | 1797.09 |
| 173 | ValAlaIleGlnProProProValValValThrLeuProGlyProIleLeuSer | 1797.09 |
| 174 | ValValIleGlnProSerProValValValThrLeuProGlyProIleLeuSer | 1815.10 |
| 175 | ProSerProValValValThrLeuProGlyProIleLeuSerSerPheProGln | 1835.03 |
| 176 | GlyValProIleSerSerGlyGlyPheGlyIleSerGlyLeuGlySerArgPheSerGly | 1838.94 |
| 177 | AlaValProLeuValArgProValThrMetValProSerIleProGlyIlePro | 1843.09 |
| 178 | ProProProValValValThrLeuProGlyProIleLeuSerSerPheProGln | 1845.05 |
| 179 | SerProValValValThrLeuProGlyProIleLeuSerSerPheProGlnAsn | 1852.02 |
| 180 | LeuProGlyProGlyLeuGlnLeuLeuHisGlyThrThrThrLeuAlaPheLys | 1864.07 |
| 181 | ProProProValValValThrPheProGlyProIleLeuSerSerPheProGln | 1879.04 |
| 182 | SerValAlaIleGlnProProProValValValThrLeuProGlyProIleLeuSer | 1884.12 |
| 183 | SerSerValAlaIleGlnProProProValValValThrLeuProGlyProIleLeu | 1884.12 |
| 184 | ArgValValIleGlnProSerProValValValThrLeuProGlyProIleLeu | 1884.17 |
| 185 | ProSerProValValValThrLeuProGlyProIleLeuSerSerPheProGlnAsn | 1949.07 |
| 186 | SerIleLeuSerGluGluGlyValProIleSerSerGlyGlyPheGlyIleSerGlyLeuGly | 1963.00 |
| 187 | SerArgValValIleGlnProSerProValValValThrLeuProGlyProIleLeu | 1971.20 |
| 188 | ArgValValIleGlnProSerProValValValThrLeuProGlyProIleLeuSer | 1971.20 |
| 189 | SerValProIleGlyAlaGlyGlySerLeuGlyLeuGlyGlyPheGlyTrpSerGlyLeuGlyArg | 2002.05 |
| 190 | ThrAlaValGlySerSerThrSerAlaAlaValGlySerIleLeuSerGluGluGlyValProIle | 2032.04 |
| 191 | SerAlaAlaValGlySerIleLeuSerGluGluGlyValProIleSerSerGlyGlyPheGlyIle | 2034.04 |
| 192 | SerGluGluGlyValProIleSerSerGlyGlyPheGlyIleSerGlyLeuGlySerArgPhe | 2040.00 |
| 193 | SerArgValValIleGlnProSerProValValValThrLeuProGlyProIleLeuSer | 2058.23 |

TABLE I-continued

| | Peptide Sequence | Peptide mass (Da) |
|---|---|---|
| 194 | SerValProIleGlyAlaGlyGlySerLeuGlyLeuGlyGlyPheGlyTrpSerGlyLeuGlyArg Gly | 2059.07 |
| 195 | AspSerArgValValIleGlnProSerProValValValThrLeuProGlyProIleLeu | 2086.23 |
| 196 | ThrAlaValGlySerSerThrSerAlaAlaValGlySerIleLeuSerGluGluGlyValProIleSer | 2119.08 |
| 197 | LeuArgGlyAspValGlyProValGlyArgThrGlyGluGlnGlyIleAlaGlyProProGlyPhe | 2137.11 |
| 198 | SerArgValValIleGlnProSerProValValValThrLeuProGlyProIleLeuSerSer | 2145.26 |
| 199 | ValValIleGlnProSerProValValValThrLeuProGlyProIleLeuSerSerPhePro | 2146.25 |
| 200 | GlyValProIleSerSerGlyGlyPheGlyIleSerGlyLeuGlySerArgPheSerGlyArgArg | 2151.14 |
| 201 | SerValProIleGlyAlaGlyGlySerLeuGlyLeuGlyGlyPheGlyTrpSerGlyLeuGlyArg GlyLeu | 2172.16 |
| 202 | AspSerArgValValIleGlnProSerProValValValThrLeuProGlyProIleLeuSer | 2173.26 |
| 203 | ValIleGlnProSerProValValValThrLeuProGlyProIleLeuSerSerPheProGln | 2175.24 |
| 204 | AlaValGlySerIleLcuSerGluGluGlyValProIleSerSerGlyGlyPheGlyIleSerGlyLeu Gly | 2190.13 |
| 205 | ArgValValIleGlnProSerProValValValThrLeuProGlyProIleLeuSerSerPhe | 2205.30 |
| 206 | SerIleLeuSerGluGluGlyValProIleSerSerGlyGlyPheGlyIleSerGlyLeuGlySerArg | 2206.14 |
| 207 | IleProSerSerValProGluSerSerPheLysIleLysGlyAsnSerSerSerPheHisIle | 2248.16 |
| 208 | ValAlaIleGlnProProProValValValThrLcuProGlyProIleLeuSerSerPheProGln | 2256.30 |
| 209 | ThrAlaValGlySerSerThrSerAlaAlaValGlySerIleLeuSerGluGluGlyValProIleSer SerGly | 2263.13 |
| 210 | ValValIleGlnProSerProValValValThrLeuProGlyProIleLeuSerSerPheProGln | 2274.31 |
| 211 | ProSerProValValValThrLeuProGlyProIleLeuSerSerPheProGlnAsnThrAlaVal Gly | 2277.25 |
| 212 | LysGluAsnPheGluValLeuCysLysAspGlyThrArgLysProValThrAspAlaGlu | 2279.13 |
| 213 | SerIleGlnAlaCysLysLeuAlaGlnSerHisGlyTrpGlyValMetValSerHisArgSer | 2282.13 |
| 214 | SerArgValValIleGlnProSerProValValValThrLeuProGlyProIleLeuSerSerPhe | 2292.33 |
| 215 | ArgValValIleGlnProSerProValValValThrLeuProGlyProIleLeuSerSerPhePro | 2302.35 |
| 216 | GluGlnProProLeuCysValAlaSerValSerValLysGluProAlaSerGluThrProAlaVal Pro | 2335.18 |
| 217 | SerValAlaIleGlnProProProValValValThrLeuProGlyProIleLeuSerSerPheProGln | 2343.33 |
| 218 | SerAlaAlaValGlySerIleLeuSerGluGluGlyValProIleSerSerGlyGlyPheGlyIleSer GlyLeuGly | 2348.20 |
| 219 | SerIleLeuSerGluGluGlyValProIleSerSerGlyGlyPheGlyIleSerGlyLeuGlySerArg Phe | 2353.20 |
| 220 | ProSerProValValValThrLeuProGlyProIleLeuSerSerPheProGlnAsnThrAlaVal GlySer | 2364.28 |
| 221 | ValValIleGlnProSerProValValValThrLeuProGlyProIleLeuSerSerPheProGln Asn | 2388.35 |
| 222 | SerArgValValIleGlnProSerProValValValThrLeuProGlyProIleLeuSerSerPhePro | 2389.39 |
| 223 | SerSerValAlaIleGlnProProProValValValThrLeuProGlyProIleLeuSerSerPhePro Gln | 2430.36 |
| 224 | ArgValValIleGlnProSerProValValValThrLeuProGlyProIleLeuSerSerPhePro Gln | 2430.41 |
| 225 | SerIleLeuSerGluGluGlyValProIleSerSerGlyGlyPheGlyIleSerGlyLeuGlySerArg PheSer | 2440.24 |

TABLE I-continued

| | Peptide Sequence | Peptide mass (Da) |
|---|---|---|
| 226 | ThrSerAlaAlaValGlySerIleLeuSerGluGluGlyValProIleSerSerGlyGlyPheGlyIle SerGlyLeuGly | 2449.25 |
| 227 | SerIleLeuSerGluGluGlyValProIleSerSerGlyGlyPheGlyIleSerGlyLeuGlySerArg PheSerGly | 2497.26 |
| 228 | SerArgValValIleGlnProSerProValValValThrLeuProGlyProIleLeuSerSerPhePro Gln | 2517.44 |
| 229 | ThrAlaValGlySerSerThrSerAlaAlaValGlySerIleLeuSerGluGluGlyValProIleSer SerGlyGlyPheGly | 2524.24 |
| 230 | SerThrSerAlaAlaValGlySerIleLeuSerGluGluGlyValProIleSerSerGlyGlyPheGly IleSerGlyLeuGly | 2536.28 |
| 231 | ArgValValIleGlnProSerProValValValThrLeuProGlyProIleLeuSerSerPhePro GlnAsn | 2544.45 |
| 232 | SerArgValValIleGlnProSerProValValValThrLeuProGlyProIleLeuSerSerPhePro GlnAsn | 2631.49 |
| 233 | AspSerArgValValIleGlnProSerProValValValThrLeuProGlyProIleLeuSerSer PheProGln | 2632.47 |
| 234 | ThrAlaValGlySerSerThrSerAlaAlaValGlySerIleLeuSerGluGluGlyValProIleSer SerGlyGlyPheGlyIle | 2637.33 |
| 235 | SerAlaAlaValGlySerIleLeuSerGluGluGlyValProIleSerSerGlyGlyPheGlyIleSer GlyLeuGlySerArgPhe | 2738.40 |
| 236 | ValGluGlnLeuValAsnLeuGlnHisLcuAspValAlaTyrAsnLeuLeuLeuGluHisAla GlnLeuAla | 2743.48 |
| 237 | SerValAlaIleGlnProProProValValValThrLeuProGlyProIleLeuSerSerPheProGln SerThrAlaValGly | 2758.54 |
| 238 | SerIleLeuSerGluGluGlyValProIleSerSerGlyGlyPheGlyIleSerGlyLeuGlySerArg PheSerGlyArgArg | 2809.46 |
| 239 | ThrSerAlaAlaValGlySerIleLeuSerGluGluGlyValProIleSerSerGlyGlyPheGlyIle SerGlyLeuGlySerArgPhe | 2839.45 |
| 240 | SerSerValAlaIleGlnProProProValValValThrLeuProGlyProIleLeuSerSerPhePro GlnSerThrAlaValGly | 2845.57 |
| 241 | SerThrSerAlaAlaValGlySerIleLeuSerGluGluGlyValProIleSerSerGlyGlyPheGly IleSerGlyLeuGlySerArgPhe | 2926.48 |
| 242 | ProSerProValValValThrLeuProGlyProIleLeuSerSerPheProGlnAsnThrAlaVal GlySerSerThrSerAlaAlaValGly | 2937.56 |
| 243 | ThrAlaValGlySerSerThrSerAlaAlaValGlySerIleLcuSerGluGluGlyValProIleSer SerGlyGlyPheGlyIleSerGlyLeuGly | 2951.48 |
| 244 | AlaValGlySerIleLeuSerGluGluGlyValProIleSerSerGlyGlyPheGlyIleSerGlyLeu GlySerArgPheSerGlyArgArg | 3036.59 |
| 245 | AsnLysValLeuValHisCysAlaMetGlyArgSerArgSerAlaThrLeuValLeuAlaTyr LeuMetIleTyrLysAsn | 3067.64 |
| 246 | SerSerValAlaIleGlnProProProValValValThrLeuProGlyProIleLeuSerSerPhePro GlnSerThrAlaValGlySerThrAla | 3104.69 |
| 247 | AlaAlaValGlySerIleLeuSerGluGluGlyValProIleSerSerGlyGlyPheGlyIleSerGly LeuGlySerArgPheSerGlyArgArg | 3107.62 |
| 248 | ThrAlaValGlySerSerThrSerAlaAlaValGlySerIleLeuSerGluGluGlyValProIleSer SerGlyGlyPheGlyIIleSerGlyLeuGlySerArg | 3194.62 |
| 249 | SerAlaAlaValGlySerIleLeuSerGluGluGlyValProIleSerSerGlyGlyPheGlyIleSer GlyLeuGlySerArgPheSerGlyArgArg | 3194.66 |
| 250 | ProSerProValValValThrLeuProGlyProIleLeuSerSerPheProGlnAsnThrAlaVal GlySerSerThrSerAlaAlaValGlySerIleLeu | 3250.76 |

TABLE I-continued

| | Peptide Sequence | Peptide mass (Da) |
|---|---|---|
| 251 | ProSerProValValValThrLeuProGlyProIleLeuSerSerPheProGlnAsnThrAlaVal GlySerSerThrSerAlaAlaValGlySerIleLeuSer | 3337.79 |
| 252 | ThrAlaValGlySerSerThrSerAlaAlaValGlySerIleLeuSerGluGluGlyValProIleSer SerGlyGlyPheGlyIleSerGlyLeuGlySerArgPhe | 3341.69 |
| 253 | ArgProArgValTyrLeuHisCysThrAsnProArgHisProLysTyrArgGluGlyAspVal ThrLeuPheAlaLeuAsnLeuSer | 3452.81 |

The invention claimed is:

1. A method of using a keratin hydrolysis peptide (KHP) solution on a cotton plant for the enhancement of the cotton plant's fertilizer absorption efficacy, comprising the steps of:

a. Preparing the KHP solution mixture by putting 70 kg of feathers whose content is 46% water in a sealed container;

b. hydrolyzing the mixture in the container with a temperature and pressure setting of 180° C. and 13 $kg/cm^2$ for a duration of 40 minutes;

c. using a mass spectrometer to confirm the combination of peptides in the solution to contain at least 253 peptides as listed in the specification where their molecular masses are between 705 and 3,195 Daltons, and the concentration is in the range of $3.0\times10^5$~$4.5\times10^5$ ppm;

d. applying the solution to lightly fertilized soil around cotton plants.

2. The method of using a keratin hydrolysis peptide (KHP) solution of claim 1, where the solution is diluted with water by volume at the ratio of 1:100-500 and is infused into the lightly fertilized soil around the planted cotton.

3. The method of using a keratin hydrolysis peptide (KHP) solution of claim 1, where the solution is diluted with water by volume at the ratio of 1:100 for applying to the lightly fertilized soil in which the cotton seeds are planted.

* * * * *